(12) United States Patent
Sabella et al.

(10) Patent No.: US 11,064,057 B2
(45) Date of Patent: Jul. 13, 2021

(54) MULTI-ACCESS EDGE COMPUTING (MEC) TRANSLATION OF RADIO ACCESS TECHNOLOGY MESSAGES

(71) Applicant: Intel Corporation, Santa Clara, CA (US)

(72) Inventors: Dario Sabella, Munich (DE); Markus Dominik Mueck, Unterhaching (DE); Miltiadis Filippou, Munich (DE); Leonardo Gomes Baltar, Munich (DE); Michael Faerber, Wolfratshausen (DE)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/646,957

(22) PCT Filed: Nov. 30, 2018

(86) PCT No.: PCT/US2018/063422
§ 371 (c)(1),
(2) Date: Mar. 12, 2020

(87) PCT Pub. No.: WO2019/109005
PCT Pub. Date: Jun. 6, 2019

(65) Prior Publication Data
US 2020/0296187 A1    Sep. 17, 2020

Related U.S. Application Data

(60) Provisional application No. 62/593,177, filed on Nov. 30, 2017.

(51) Int. Cl.
*G06F 15/16* (2006.01)
*H04L 29/06* (2006.01)
(Continued)

(52) U.S. Cl.
CPC .............. *H04L 69/08* (2013.01); *H04L 67/12* (2013.01); *H04L 67/289* (2013.01); *H04W 4/40* (2018.02); *H04L 67/10* (2013.01)

(58) Field of Classification Search
CPC ....... H04L 69/08; H04L 67/12; H04L 67/289; H04L 67/10; H04W 4/40
(Continued)

(56) References Cited

U.S. PATENT DOCUMENTS 8,804,625 B2 * 8/2014 Akhtar .................... H04L 47/70
370/329
9,516,483 B2 * 12/2016 Hansen ................... H04W 4/18
(Continued)

FOREIGN PATENT DOCUMENTS

EP         1566944 A1      8/2005
WO    WO-2018065048 A1 *  4/2018  .............. H04W 4/06
(Continued)

OTHER PUBLICATIONS

"International Application Serial No. PCT US2018 063422, International Preliminary Report on Patentability dated Jun. 11, 2020", 10 pgs.
(Continued)

*Primary Examiner* — Alicia Baturay
(74) *Attorney, Agent, or Firm* — Schwegman Lundberg & Woessner, P.A,

(57) ABSTRACT

An architecture to allow the translation or conversion of short-range direct communications between devices with different radio access, such as in a V2X (vehicle-to-everything) communication context, is disclosed. In an example, a translation process, such as is performed by a mobile/ multi-access edge computing (MEC) communication entity, includes: obtaining or accessing, at a translation function, a communication message (e.g., IP message) provided from a
(Continued)

first device operating with a first radio access technology (e.g., LTE C-V2X), the message addressed to a second device operating with a second radio access technology (e.g., IEEE 802.11p or DSRC/ITS-G5); converting the communication message, with the translation function, into a format compatible with the second radio access technology; and initiating a transmission of the translated communication message, from the translation function, to the second device using the second radio access technology.

24 Claims, 24 Drawing Sheets

(51) Int. Cl.
 *H04W 4/40* (2018.01)
 *H04L 29/08* (2006.01)
(58) Field of Classification Search
 USPC .......................................................... 709/246
 See application file for complete search history.

(56) References Cited

U.S. PATENT DOCUMENTS

| | | | | |
|---|---|---|---|---|
| 9,854,588 | B2 * | 12/2017 | Veerepalli | H04L 67/306 |
| 9,922,553 | B2 * | 3/2018 | McErlean | G08G 1/166 |
| 9,980,152 | B2 * | 5/2018 | Laselva | H04W 48/00 |
| 10,054,662 | B2 * | 8/2018 | Povolny | G01S 5/0027 |
| 10,110,495 | B1 * | 10/2018 | Sabella | H04M 15/8044 |
| 10,137,905 | B2 * | 11/2018 | Dai | B60W 10/184 |
| 10,165,574 | B2 * | 12/2018 | Baghel | H04L 5/0007 |
| 10,171,953 | B2 * | 1/2019 | Narayanan | G08G 1/205 |
| 10,216,184 | B2 * | 2/2019 | Vega | B64C 39/024 |
| 10,281,925 | B2 * | 5/2019 | Sakr | G05D 1/0276 |
| 10,284,655 | B2 * | 5/2019 | Weisman | H04W 74/0833 |
| 10,313,063 | B2 * | 6/2019 | Laselva | H04L 1/1854 |
| 10,341,868 | B2 * | 7/2019 | Ross | H04L 63/0485 |
| 10,356,798 | B2 * | 7/2019 | Hu | H04W 72/1242 |
| 10,375,713 | B2 * | 8/2019 | Gulati | H04L 27/0006 |
| 10,403,135 | B2 * | 9/2019 | Rosales | G08G 1/0141 |
| 10,405,161 | B2 * | 9/2019 | Mishra | H04L 67/12 |
| 10,423,844 | B2 * | 9/2019 | Dai | G06K 9/00825 |
| 10,433,120 | B2 * | 10/2019 | Dizdarevic | H04W 4/021 |
| 10,440,096 | B2 * | 10/2019 | Sabella | H04L 47/762 |
| 10,490,075 | B2 * | 11/2019 | Bai | G08G 1/162 |
| 10,499,457 | B2 * | 12/2019 | Michaelis | H04L 45/50 |
| 10,567,291 | B2 * | 2/2020 | Sabella | H04L 47/824 |
| 10,568,060 | B2 * | 2/2020 | Cattoni | H04W 60/04 |
| 10,595,157 | B2 * | 3/2020 | Futaki | H04W 76/11 |
| 10,624,115 | B2 * | 4/2020 | Feng | H04W 76/14 |
| 10,681,567 | B2 * | 6/2020 | Kovacs | H04B 7/0617 |
| 10,685,504 | B2 * | 6/2020 | Mueck | G07C 5/008 |
| 10,708,846 | B2 * | 7/2020 | Rasanen | H04W 88/10 |
| 10,721,583 | B2 * | 7/2020 | Guo | H04W 4/021 |
| 10,735,993 | B2 * | 8/2020 | Bostrom | H04W 36/22 |
| 10,743,154 | B2 * | 8/2020 | Xu | H04W 4/46 |
| 10,757,709 | B2 * | 8/2020 | Uchiyama | H04W 72/0473 |
| 10,757,757 | B2 * | 8/2020 | Sabella | H04W 12/009 |
| 10,791,553 | B2 * | 9/2020 | Xu | H04W 24/10 |
| 10,796,572 | B2 * | 10/2020 | Farr | G05D 1/0274 |
| 10,798,738 | B2 * | 10/2020 | Tang | H04W 72/08 |
| 10,802,110 | B2 * | 10/2020 | Va | G01S 13/931 |
| 10,848,974 | B2 * | 11/2020 | Bachmutsky | G06F 9/45558 |
| 2018/0295655 | A1 * | 10/2018 | Cavalcanti | H04W 76/10 |
| 2019/0053000 | A1 * | 2/2019 | Filippou | G06F 8/76 |
| 2019/0075548 | A1 * | 3/2019 | Lee | H04W 52/383 |
| 2019/0132709 | A1 * | 5/2019 | Graefe | H04W 4/38 |
| 2019/0138908 | A1 * | 5/2019 | Bernat | G06N 3/0454 |
| 2019/0140919 | A1 * | 5/2019 | Smith | H04L 41/5019 |
| 2019/0141142 | A1 * | 5/2019 | Filippou | H04W 4/40 |
| 2019/0158606 | A1 * | 5/2019 | Guim Bernat | H04W 4/40 |
| 2019/0213882 | A1 * | 7/2019 | Sachs | G08G 1/096716 |
| 2019/0222652 | A1 * | 7/2019 | Graefe | H04W 84/18 |
| 2019/0230480 | A1 * | 7/2019 | Kaloxylos | H04W 60/00 |
| 2019/0305903 | A1 * | 10/2019 | Badic | H04L 5/0041 |
| 2019/0339082 | A1 * | 11/2019 | Doig | G06F 16/29 |
| 2019/0349874 | A1 * | 11/2019 | Baek | H04W 56/002 |
| 2020/0053527 | A1 * | 2/2020 | Nylander | H04W 88/06 |
| 2020/0107186 | A1 * | 4/2020 | Park | H04W 4/40 |
| 2020/0112989 | A1 * | 4/2020 | Zeng | H04W 72/1205 |
| 2020/0127861 | A1 * | 4/2020 | Doshi | G06F 21/6209 |
| 2020/0178198 | A1 * | 6/2020 | Ding | G07C 5/008 |
| 2020/0229038 | A1 * | 7/2020 | Zhu | G06F 9/546 |
| 2020/0229206 | A1 * | 7/2020 | Badic | H04W 40/24 |
| 2020/0267518 | A1 * | 8/2020 | Sabella | H04W 48/16 |
| 2020/0280827 | A1 * | 9/2020 | Fechtel | H04W 4/80 |
| 2020/0296045 | A1 * | 9/2020 | Sabella | H04W 92/18 |
| 2020/0314600 | A1 * | 10/2020 | Kolde | H04W 24/08 |
| 2020/0389772 | A1 * | 12/2020 | Szilagyi | H04W 4/44 |

FOREIGN PATENT DOCUMENTS

| | | | | |
|---|---|---|---|---|
| WO | WO-2018074957 | A1 * | 4/2018 | H04W 4/046 |
| WO | WO-2018182592 | A1 | 10/2018 | |
| WO | WO-2019109005 | A1 | 6/2019 | |

OTHER PUBLICATIONS

"International Application Serial No. PCT/US2018/063422, International Search Report dated Feb. 26, 2019", 5 pgs.

"International Application Serial No. PCT/US2018/063422, Written Opinion dated Feb. 26, 2019", 11 pgs.

Festag, Andreas, "Standards for vehicular communication-from IEEE 802.11p to 5G", Elektrotechnik und Informationstechnik, Springer Verlag, Wien, AT, vol. 132, No. 7, (Sep. 29, 2015), 409-416.

Intel Deutschland Gmbh, "Contribution on Interoperability—TR 103 576-2", ETSI Draft; ITSWG2(18)036O03, European Telecommunications Standards Institute (ETSI), 650, Route Des Lucioles ; F-06921 Sophia-Antipolis, France vol. WG ITS WG2 Architecture and Cross Layer, Retrieved from the Internet: <URL:docbox.etsi.org/ITS/ITSWG2/05-CONTRIBUTIONS/2018/1TSWG2(18)036003_Contribution_on_Interoperability_-_TR_103_576-2.zip/ITSWG2(18)036003_Contribution_on_Interoperability_-_TR_103_576-2.docx> [retrieved on Mar. 26, 2018], (Mar. 26, 2018), 1-4.

\* cited by examiner

MULTI-ACCESS EDGE COMPUTING (MEC) TRANSLATION OF RADIO ACCESS TECHNOLOGY MESSAGES

PRIORITY CLAIM

This application is a U.S. National Stage Filing under 35 U.S.C. 371 from International Application No. PCT/US2018/063422, filed Nov. 30, 2018 and published in English as WO 2019/109005 on Jun. 6, 2019, which claims the benefit of priority to U.S. Application Ser. No. 62/593,177, filed Nov. 30, 2017, which is incorporated herein by reference in its entirety.

TECHNICAL FIELD

Embodiments described herein generally relate to multi-access edge computing and related wireless communication systems, and in particular, to an edge computing architecture configured to provide message translation among multiple types of radio access technology (RAT) communications, including a conversion between Dedicated Short-Range Communication (DSRC) and Long Term Evolution (LTE) message types, to support location-changing information services.

BACKGROUND

MEC (multi-access edge computing or mobile edge computing) encompasses architectures that enable cloud computing functionality or information technology (IT) services at network (e.g., cellular network) edges. MEC may reduce network congestion by moving applications, data, discovery, etc. closer to the user (e.g., mobile device, user equipment (UE), station (STA), etc.). Some MEC details dealing with security (e.g., both user security as well as application integrity), radio use, etc., have been promulgated by European Telecommunications Standards Institute (ETSI), such as described in the "Mobile Edge Computing Introductory Technical White Paper," published Sep. 1, 2014. A set of specifications and white papers providing further details and implementation use cases for MEC scenarios is being developed and published on an ongoing basis by ETSI as part of the ETSI MEC industry specification group (ISG).

MEC is intended to support developing mobile use cases of edge computing, to allow application developers and content providers to access computing capabilities and an IT service environment in dynamic settings at the edge of the network. Edge computing, at a more general level, refers to the transition of compute and storage resources closer to, or into, smart endpoint devices in order to optimize total cost of ownership, reduce application latency, improve service capabilities, and improve compliance with security or data privacy requirements. Edge computing may in some scenarios provide a cloud-like distributed service, which offers orchestration and management for applications among many types of storage and compute resources.

Edge computing may be further integrated with use cases and technology developed for the Internet of Things (IoT) and Fog networking, as endpoint devices and gateways attempt to access network resources and applications at locations moved closer to the "edge" of the network. In these and other settings, edge computing attempts to offer reduced latency, increased responsiveness, and more available computing power than offered in traditional cloud network services and wide area network connections. Despite the rapid activity occurring with the development of standards and architectures involving these technologies, many limitations and technical problems still exist in the design and use of IoT, MEC, and next-generation edge networks.

Vehicle-to-everything (V2X) is an important scenario being actively considered as an implementation of Edge, MEC, and IoT technologies. V2X communications featuring shortrange direct communication between vehicles is currently supported by two radio access standards, (1) Third Generation Partnership Project (3GPP) Long Term Evolution (LTE) cellular V2X (C-V2X), and (2) Institute of Electrical and Electronics Engineers (IEEE) 802.11p based Dedicated Short-Range Communication (DSRC), which is also specified in Europe as European Telecommunications Standards Institute (ETSI) Intelligent Transport System (ITS)-G5. Both systems are defined independently of each other and have no provisions for interoperability.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
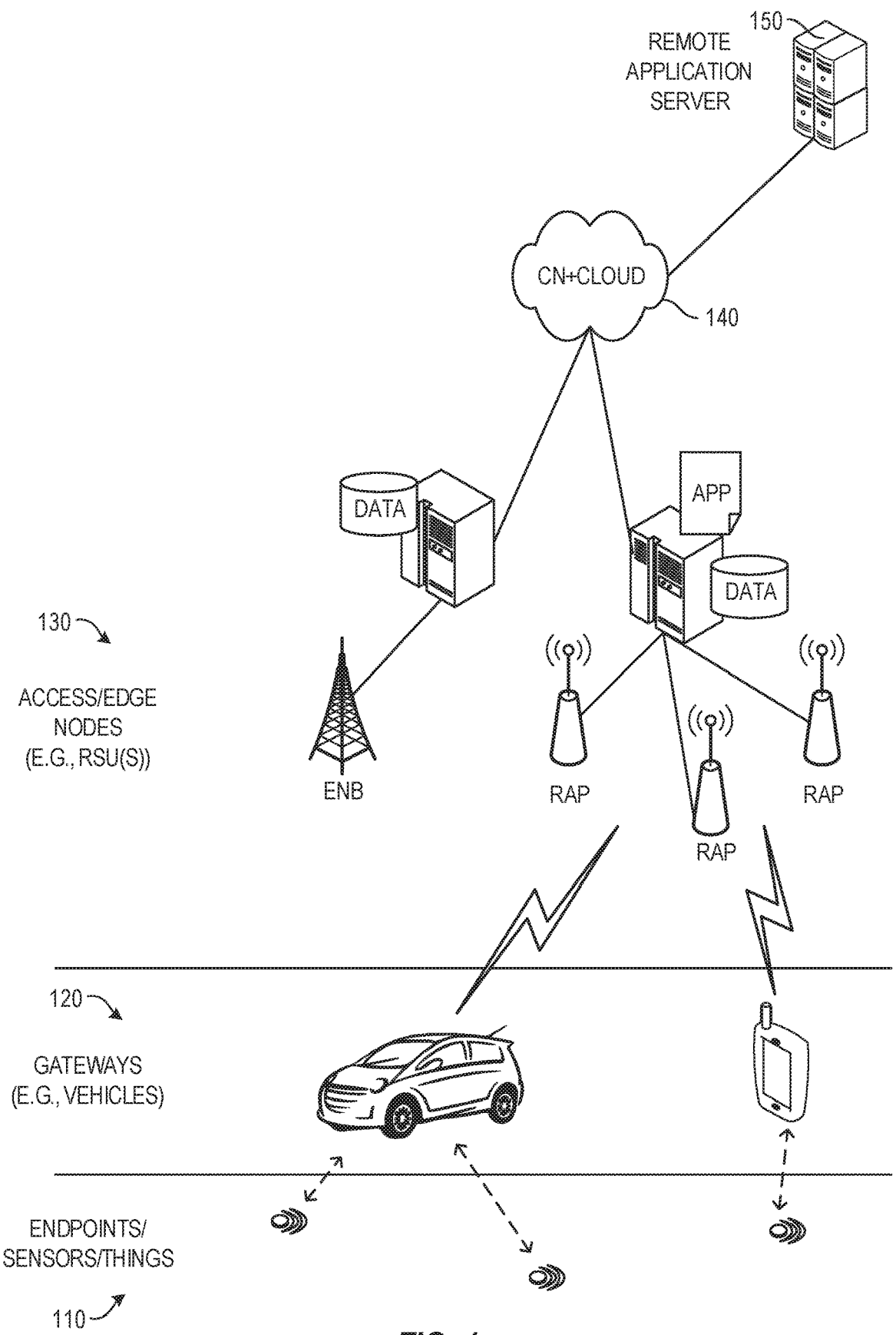
FIG. 1 illustrates devices and network entities in a multi-access communications environment, according to an example.

In the following description, methods, configurations, and related apparatuses are disclosed for a MEC architecture configuration, which enables the translation, orchestration, and communication of messages between a first and second RAT in a mobile communications setting (e.g., translation of DSRC/ITS-G5 messages into LTE C-V2X messages and vice versa). As an overview, the problems addressed and solutions disclosed integrate MEC systems with various types of mobile device networking implementations (including those applicable to Edge, IoT, or Fog computing scenarios). These may benefit a variety of use cases, such as fifth generation (5G) network communications among automotive devices, including those use cases termed as V2X, vehicle-to-vehicle (V2V), and vehicle-to-infrastructure (V2I). As with most Edge and MEC installations, the goal with the present configuration is to bring the application endpoints as close to the vehicular environment, or other endpoints, as possible, and improve the performance of computing and network resources, to enable low latency or high bandwidth services.

The following systems and techniques may be implemented in, or augment, virtualized environments. These environments may be implemented within various types of MEC, network function virtualization (NFV), or fully virtualized 4G/5G network configurations. As is understood, MEC architectures offer application developers and content providers cloud-computing capabilities and an IT service environment at the edge of the network. This environment offers ultra-low latency and high bandwidth throughput as well as real-time access to radio network information that may be leveraged by applications. MEC technology permits flexible and rapid deployments of innovative applications and services towards mobile subscribers, enterprises, or vertical segments. For example, regarding the automotive sector, applications such as V2X (e.g., IEEE 802.11p, or 3GPP LTE C-V2X) exchange data, provide data to aggregation points, or access data in databases, to ascertain an overview of the local situation derived from a multitude of sensors (e.g., by various cars, roadside units, etc.).

Specifically, the presently described architecture supports a MEC-based service or facility, implemented with hardware and software resources, which orchestrates and executes the translation (e.g., conversion, transcoding, modification, etc.) of Dedicated Short-Range Communication (DSRC)/Intelligent Transport System (ITS)-G5 messages into Long Term Evolution (LTE) cellular (C-V2X) messages and vice versa. Embodiments exploit the fact that the safety and non-safety messages and security mechanisms located above the DSRC/LTE radio access, transport and network layers are identical or very similar to one another. The translation mechanism of the embodiments herein includes extracting the content of a DSRC facilities layer message and placing or inserting the extracted content into an LTE C-V2X facilities layer message, and vice versa. The embodiments herein may allow various vehicle communication systems to comprehend transmitted messages from neighboring vehicles independent of whether the original transmission is of the same or different radio access protocol (e.g., DSRC/ITS-G5 or LTE C-V2X based), a development which may enhance vehicular safety and network performance, as a whole.

In the present disclosure, the terms LTE, C-V2X. LTE-V. LTE-V2V, and the like are used to characterize the 3GPP based system concepts and encompasses all evolution steps of 3GPP either enhancing the LTE sidelink in future releases, or towards the enhancement of the 3GPP standard for the 5G New Radio (NR). In other words, all described solutions referencing LTE may cover NR/5G or other like systems. With the term "message translation", in the following description is intended to also encompass "protocol-wise conversion of message-carrying entities." Furthermore, in the present disclosure DSRC 802.11p technology may be referred to as WLAN, Wi-Fi, or the like, and C-V2X technology may be referred to as LTE or the like.

FIG. 1 illustrates devices and network entities in a multi-access communications environment. FIG. 1 specifically illustrates the different layers of communication occurring within the environment, starting from endpoint sensors or things 110 (e.g., operating in an IoT network topology); increasing in sophistication to gateways (e.g., vehicles) or intermediate nodes 120, which facilitate the collection and processing of data from endpoints 110; increasing in processing and connectivity sophistication to access or edge nodes 130 (e.g., road-side units operating as edge computing nodes), such as may be embodied by base stations (eNBs), roadside access points (RAPs) or roadside units (RSUs), nodes, or servers; and increasing in connectivity and processing sophistication to a core network or cloud setting 140. Indeed, the processing at the core network or cloud setting 140 may be enhanced by network services as performed by a remote application server 150 or other cloud services.

As shown, in the scenario of FIG. 1, the endpoints 110 communicate various types of information to the gateways or intermediate nodes 120; however, due to the mobility of the gateways or intermediate nodes 120 (such as in a vehicle or mobile computing device) this results in multiple access points or types of access points being used for network access, multiple distinct services and servers being used for computing operations, multiple distinct applications and data being available for processing, and multiple distinct network operations being offered as the characteristics and capabilities of the available network services and network pathways change. In particular, the dynamic nature of V2X, Vehicle-to-Vehicle (V2V) and Vehicle-to-Infrastructure (V2I) usage from vehicle user equipment (UE) or human-operated portable UEs (e.g., mobile smartphones and computing devices) introduces significant complexity for network usage.

Figure 2:
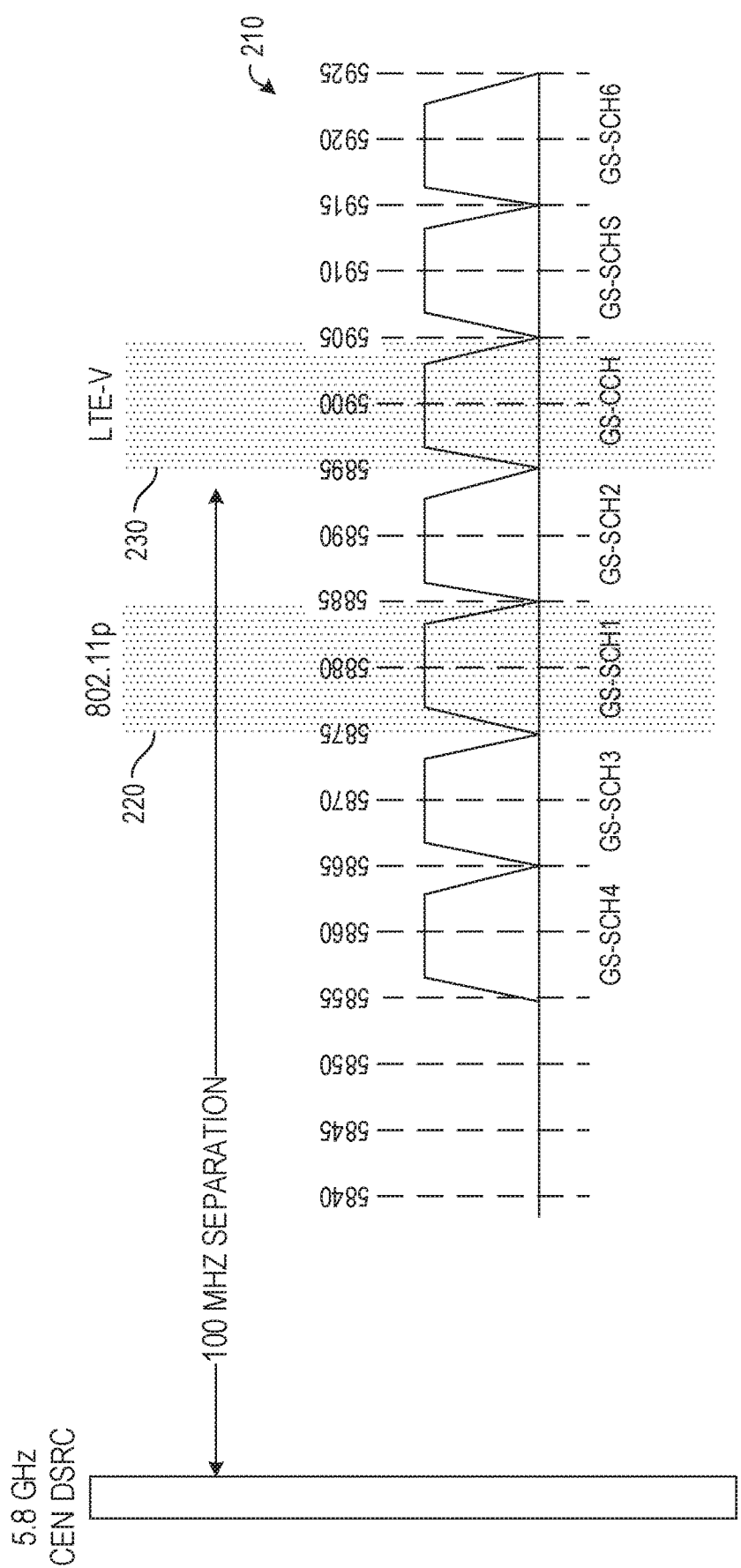
FIG. 2 illustrates an example interference scenario of traditional broadcast involving IEEE 802.11p and 3GPP LTE-V protocols, according to an example.

FIG. 2 illustrates an example interference scenario of traditional broadcasts involving IEEE 802.11p and 3GPP LTE-V protocol usage. For developing V2X systems featuring short-range direct communication between vehicles, spectrum is being allocated in the 5.9 GHz band 210 (5.855 GHz-5.925 GHz), with usable channel bandwidths 210 commonly of 10 MHz, which may lead to 7 channels available for V2V and V2I communication. These bands are expected to include safety and non-safety applications. LTE C-V2X is expected to use one of these channels for V2V and V2I communications (e.g., in range 230), while additional. IEEE 802.11p based DSRC systems are expected to use multiple channels (control, service and multimedia data flow, e.g., in range 220).

Figure 3A:
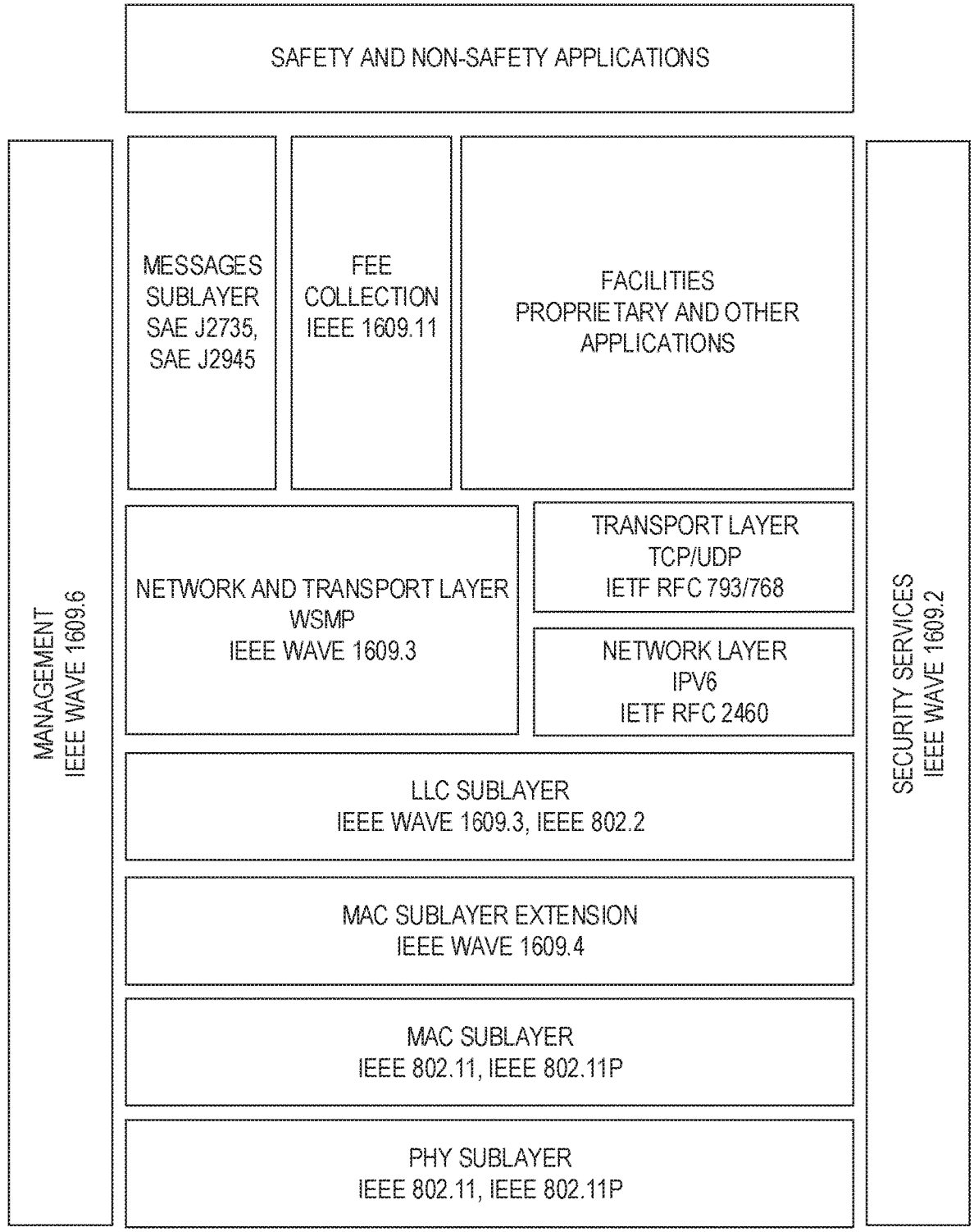
FIGS. 3A and 3B illustrate respective components of IEEE WAVE and 3GPP V2X protocol architectures, according to an example.
Figure 3B:
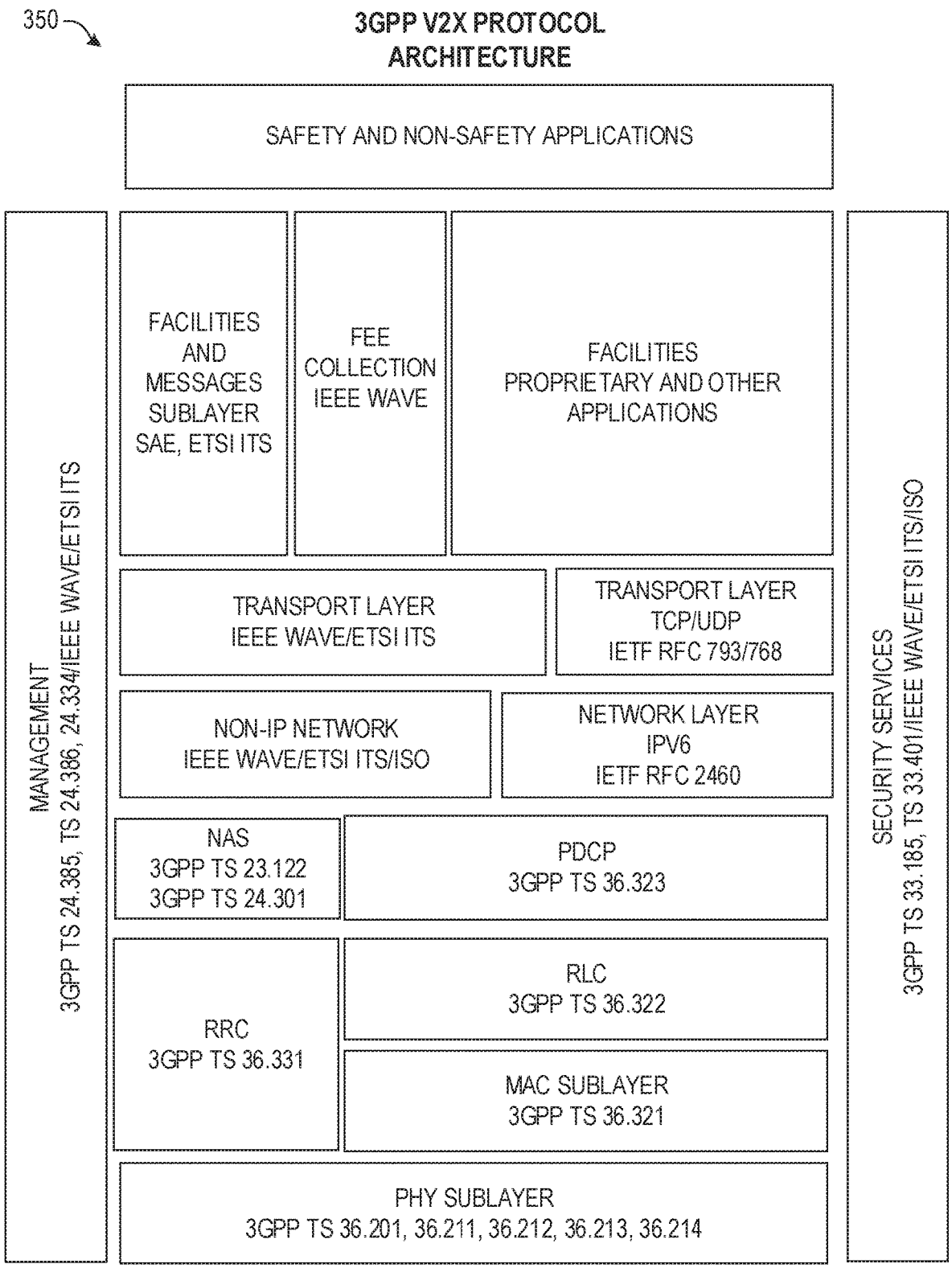

With reference to FIG. 3A, a protocol architecture 300 for the IEEE WAVE standard used by DSRC systems is shown. Referring to FIG. 3B, a protocol architecture 350 for the 3GPP LTE V2X specification is shown. Based on FIGS. 3A-3B, the radio access layers include many differences, while the transport and network layers share many similarities, and the facilities' layers may in some cases be identical. As an example, a Basic Safety Message (BSM) employed by DSRC systems (e.g., deployed in the United States of America) may be transmitted via both 3GPP or IEEE based protocols. This message may appear to be identical from the application and/or higher layer perspective, but may appear substantially different from the perspective of lower protocol layers as well as the radio interface. In various embodiments, the following introduces a MEC-based approach for the conversion of DSRC messages to 3GPP LTE C-V2X messages, and vice versa, to guarantee interoperability between the competing V2X systems.

Some proposed workarounds have offered to exploit the co-existence of the DSRC/ITS G5 and LTE C-V2X vehicular protocols; however, such scenarios often assume a clustered-based, heterogeneous network architecture, where, at least some of the vehicles support both protocols (e.g., in dual-radio UEs). Additionally, some such proposed workarounds assume that at least one vehicle within the coverage area of an LTE eNB can support both protocols (operating as a cluster head), while other vehicles in its vicinity only support the DSRC/ITS G5 protocol. Given this assumption, the cluster head can broadcast the (local) messages it receives by its cluster members to other cluster heads via LTE connectivity. Nevertheless, these approaches presume dual protocol support by, at least one vehicle per cluster, even as all messages received by LTE eNBs have to traverse the whole core network (e.g., Evolved Packet Core (EPC)) prior to being disseminated to the rest of the cluster heads by the use of multiple unicast LTE transmissions. The cluster heads may need to perform a second hop exploiting DSRC connectivity towards reaching their cluster members, thus, resulting in considerable latencies.

Further, a similar workaround has been proposed, where a two-hop mesh-based multicasting framework is used, for targeting infotainment applications. Given this setup, a cluster head election mechanism is intended to guarantee Quality-of-Service (QoS) demands. Nevertheless, the existence of spatially separated vehicular clusters is presumed, where some of the vehicles are capable of applying both protocols, an assumption which might not always hold in practice. Moreover, similar concepts encapsulating the above mentioned assumptions have been investigated in other workarounds that focus on video streaming multicasting or focus safety message dissemination.

Another proposed workaround for multiple RATs uses MEC hosts installed in the vicinity of LTE eNBs with the aim of reducing the introduced latencies when IP packets are routed through the LTE core network. In such workarounds, a Software Defined Network (SDN) based architecture assisted by MEC and integrating different RATs is proposed to target low-latency and increased reliability for communications. The processing proximity, which is available due to the deployment of MEC hosts across the network can decrease packet delays, while, orchestration by means of the SDN technology can provide flexible control and enhance QoS. However, in this scenario, is assumed that all-purpose, protocol-agnostic digital transceivers are employed in all vehicular devices (DSRC and cellular devices). Such an assumption might not hold in practice, as different automotive manufacturers may choose to deploy communication infrastructure focusing on one or the other protocol. Also, MEC hosts are proposed to be only installed in co-existence with LTE eNBs, hence, the possibility of exploiting processing/storage capabilities, e.g., at RSUs, is not discussed at all in such approaches. In other words, the lack of LTE-WLAN aggregation (LWA) is not considered in such proposals. Thus, while the advantages of MEC for vehicular communication may be considered, possible non-compatibility issues among the exchanged messages due to protocol divergence have not been addressed.

In all of the aforementioned workarounds, the possibility of having vehicles supporting a single, specific communication protocol is not considered. The aforementioned workarounds assume that some vehicles support both RATs/protocols, and these vehicles (candidate cluster heads) are in close proximity to ones supporting only the DSRC protocol, while in other approaches it is assumed that MEC hosts are only deployed in the vicinity of LTE eNBs and all vehicles are equipped with transceivers agnostic to the V2X communication protocol, which is an unlikely real-world scenario. As a result, with other proposed workarounds, in the absence of vehicular devices supporting both protocols, messages broadcasted by a DSRC/ITS-G5-capable vehicle would be simply missed by an LTE C-V2X capable vehicle and vice versa.

Figure 4:
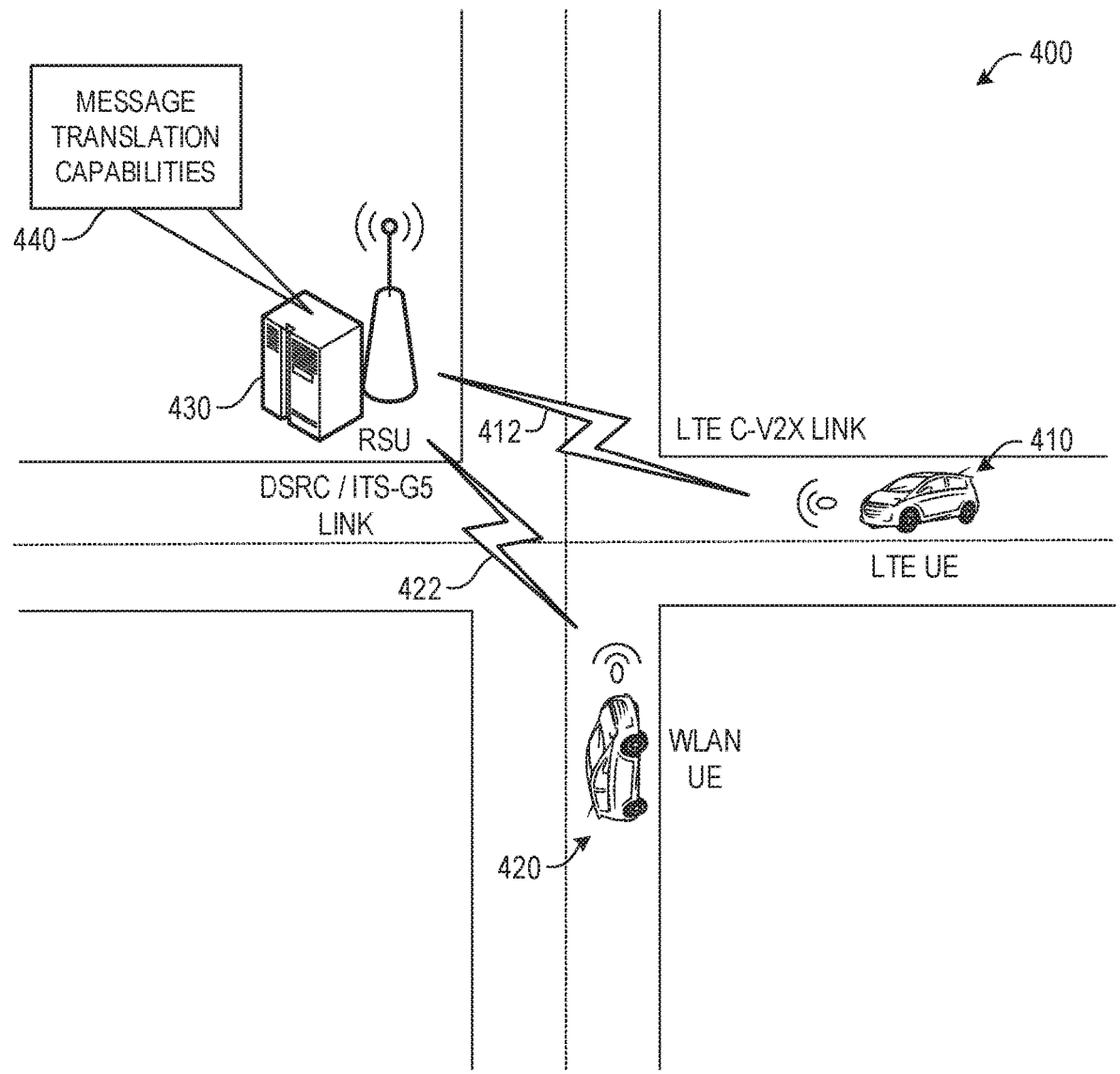
FIG. 4 illustrates an operative arrangement of network and vehicle user equipment, according to an example.

FIG. 4 illustrates an operative arrangement 400 of network and vehicle user equipment, in which various embodiments may be practiced. In arrangement 400, a vehicle user equipment (vUE) 410 may be equipped with an LTE C-V2X communication system whereas vUE 420 may be equipped with a DSRC/ETSI ITS-G5 (WLAN) communication system. In embodiments, a Road Side Unit (RSU) 430 may provide translation services 440 so that vUEs 410 and 420 may communicate with one another. In embodiments, the translation services may be provided by a MEC host (e.g., an ETSI MEC host) implemented in or by the RSU 430. In this example, the RSU 430 may be a stationary RSU, such as an eNB-type RSU or other like infrastructure. In other embodiments, the RSU 430 may be a mobile RSU or a UE-type RSU, which may be implemented by a vehicle (e.g., a truck), pedestrian, or some other device with such capabilities. In these cases, mobility issues can be managed in order to ensure a proper radio coverage of the translation entities.

Figure 5B:
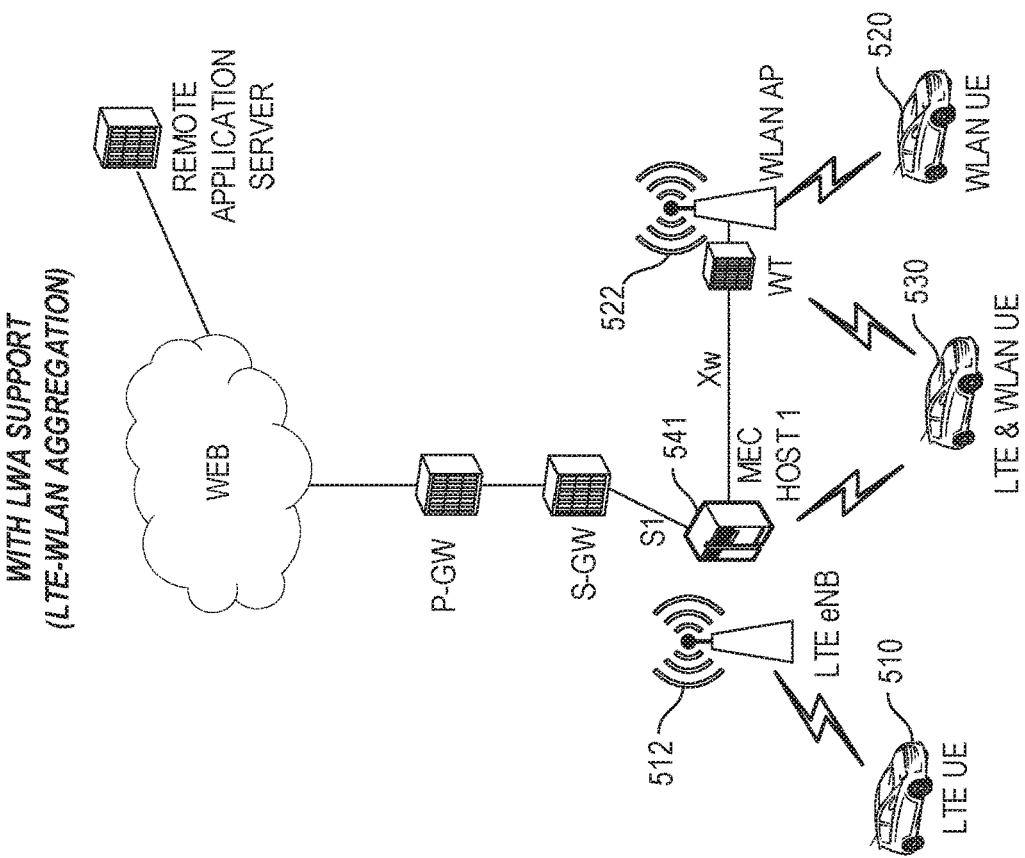
FIGS. 5A and 5B illustrate example MEC deployment options for message translation with and without aggregation, according to an example.
Figure 5A:
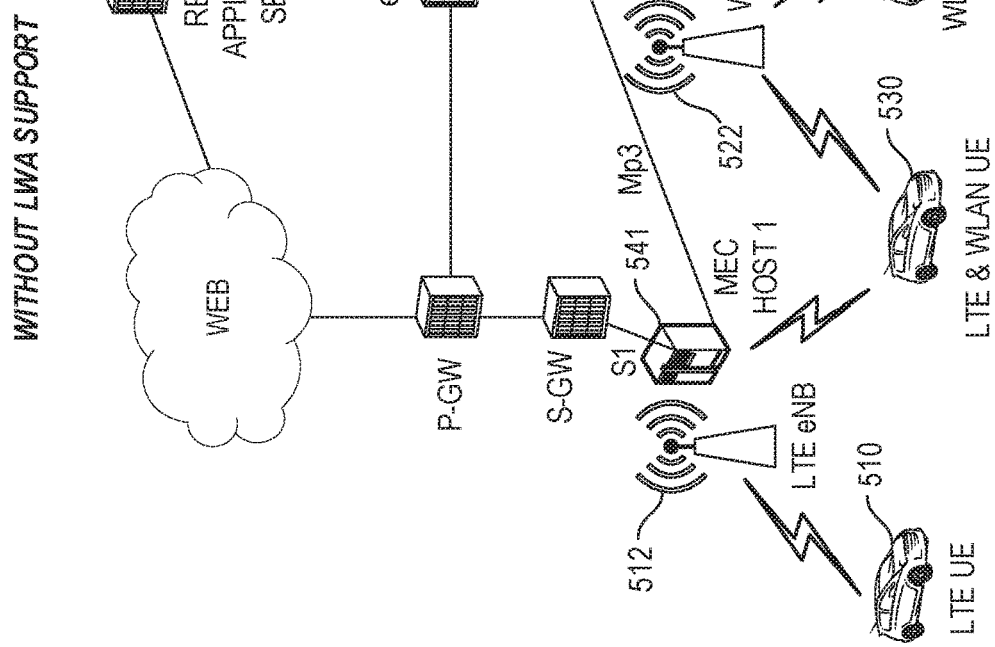

In an example, various network deployment options are possible with the present techniques, when considering the existence of both LTE and WLAN networks. FIGS. 5A and 5B depicts example MEC deployment options in accordance with various embodiments, including a scenario in FIG. 5A without LTE-WLAN Aggregation (LWA) and a scenario in FIG. 5B with LWA support. From an infrastructure point-of-view, interworking between LTE and WLAN systems is possible in two ways. (1) through connection to the packet data network gateway (P-GW) without support of LTE-WLAN aggregation (LWA) as shown by the scenario in FIG. 5A, and (2) directly through the Xw interface with the support of LWA as shown by the scenario in FIG. 5B. Embodiments may consider three options from a UE point-of-view, including LTE-only vUEs 510, WLAN-only vUEs 520, and vUEs 530 capable of communicating using both LTE and WLAN technologies. In this scenario, covering all cases, the problem of translating LTE messages to DSRC messages, and vice versa, may be solved when considering vehicles connected to only one Radio Access Technology (RAT) (e.g., LTE-only vUEs or WLAN-only vUEs), and especially when the coverage of the two RATs in a given area is not congruent or co-extensive (e.g., LTE and WLAN coverage areas are only partially overlapping). As discussed in the following example, such conversion may be facilitated via MEC hosts 541, 542, even as the vUEs are connected to the respective access networks (e.g., provided by LTE eNB 512 and WLAN AP 522). As further illustrated in FIGS. 6 and 7, respectively, message translation functionality may be provided within a deployment of a MEC host per LTE eNBs for LWA systems, or within a deployment of MEC hosts co-located with all LTE eNBs and all RSUs/WLAN APs without support of LWA.

Figure 6:
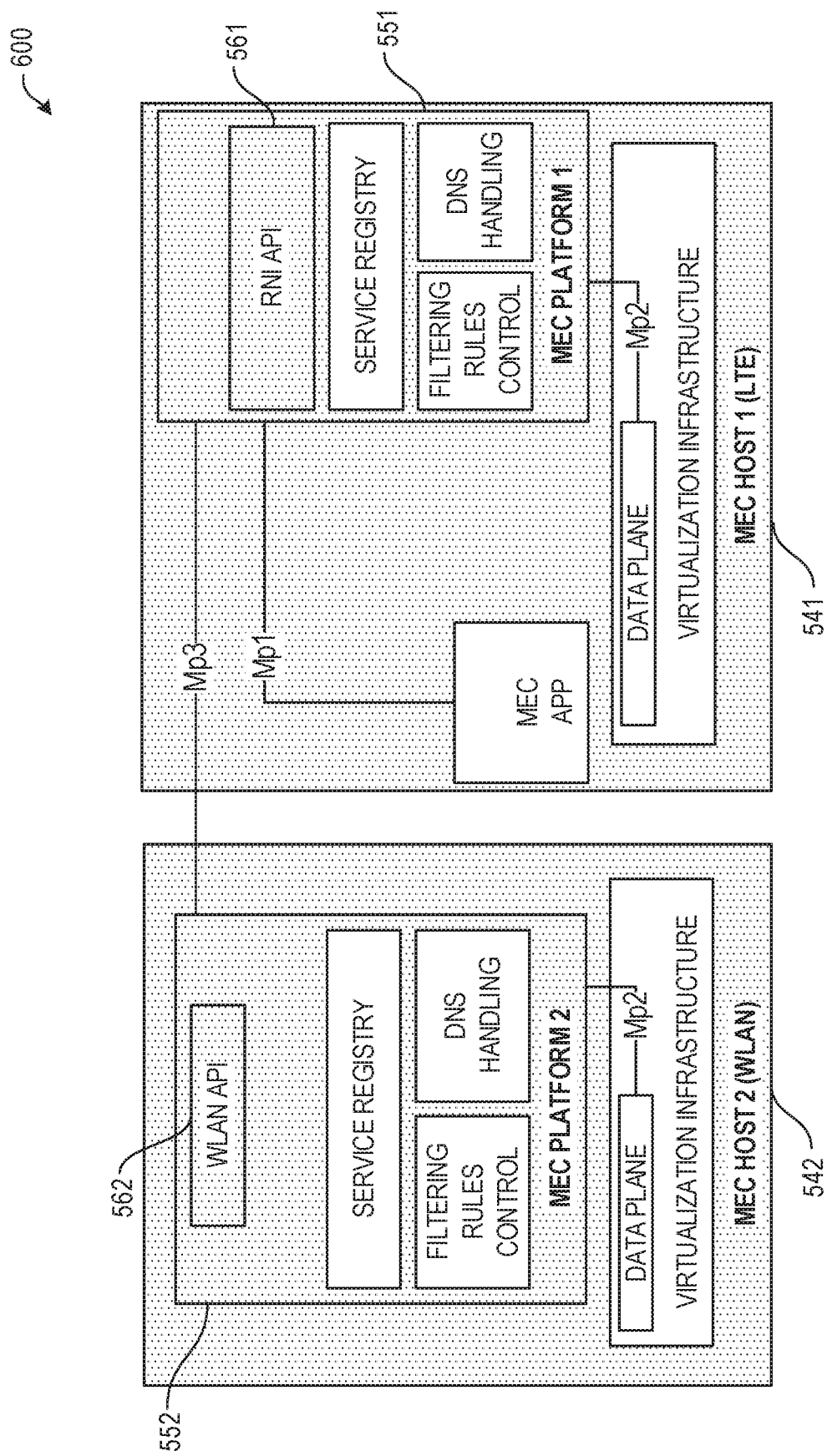
FIGS. 6 and 7 illustrate example MEC host implementations for message translation without and with aggregation, according to an example.
Figure 7:
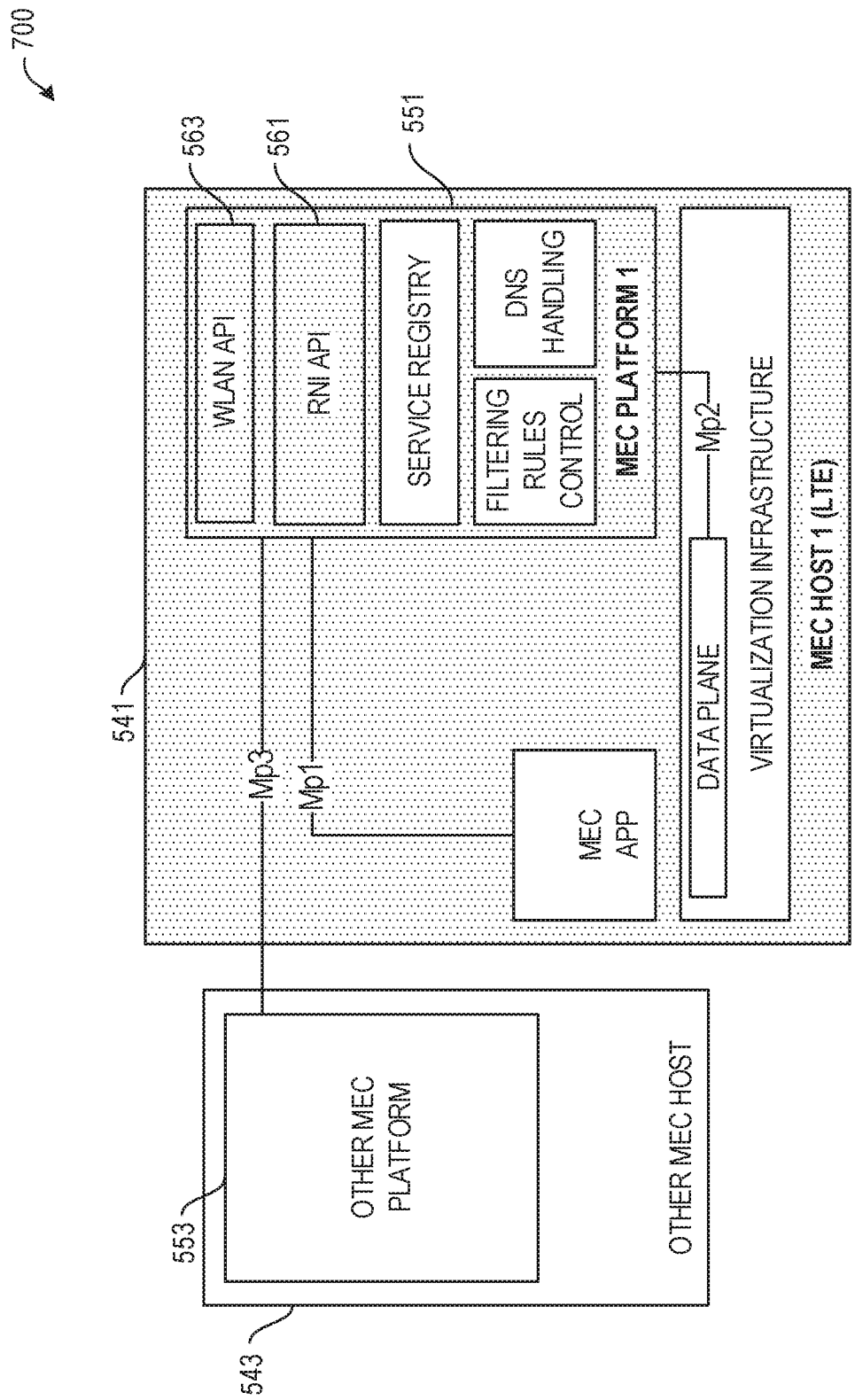

FIG. 6 specifically depicts an example MEC host implementation 600 without LWA support (e.g., S2B, among MEC hosts 541, 542) and FIG. 7 depicts an example MEC host implementation 700 with LWA support. With regards to the incoming IP packet traffic, the data plane of the virtualization infrastructure of implementations 600 and 700 may be instructed by the corresponding MEC platform (e.g., MEC platforms 551, 552) to route the network traffic (e.g., IP messages) from the underlying network, as the network can be both a 3GPP network and/or a non-3GPP network. The respective implementations may include use and coordination of a Radio Network Information (RNI) application programming interface (API) 561, a WLAN API 562, 563, and other components to coordinate and exchange information regarding RAN characteristics and operations.

Figure 8:
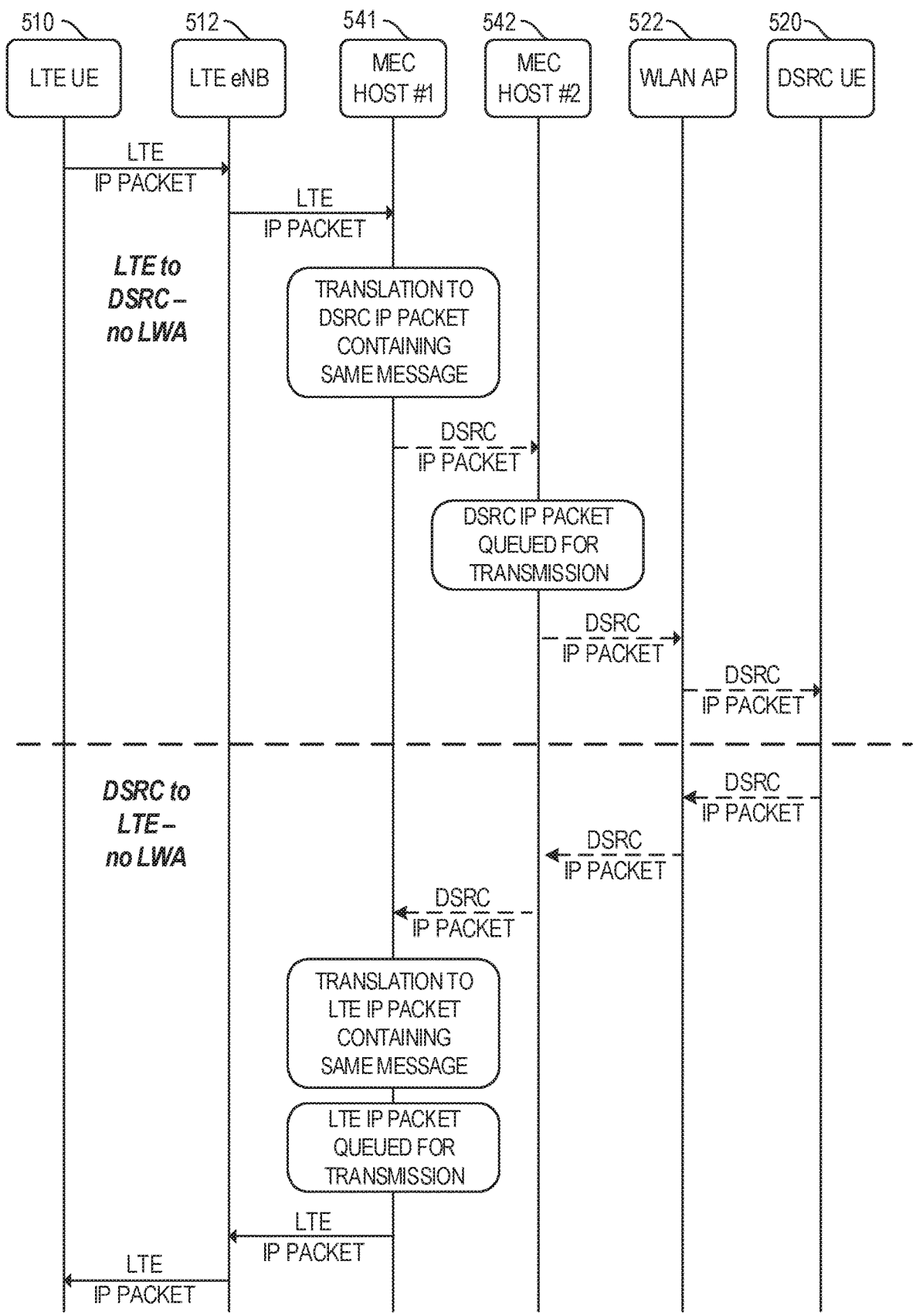
FIGS. 8 and 9 illustrate message translation procedures, with and without aggregation, according to an example.

In an example, message translation procedures may be designed in the existence or absence of LWA. FIG. 8 depicts an example translation procedure 800, which may be used in systems that do not include LWA, in accordance with some embodiments. For procedure 800, it may be assumed that every active UE of each network is associated to the respective MEC application running on a related MEC host.

In the example scenario of FIG. 8 with absence of LWA, which may be the most general case, there may be two separate MEC Hosts (e.g., MEC host 1 and MEC host 2). Additionally, LTE-only UEs are associated to a MEC application (app) 1 running on the MEC Host 1, which is deployed in the LTE network. This means that MEC app 1 may know the IP addresses of all the active UEs in the LTE network. Additionally, WLAN-only UEs are associated to a MEC app 2 running on the MEC Host 2, which is deployed in a WLAN network. This means that MEC app 2 may know the IP addresses of all the active UEs in the WLAN network. In particular, when considering the absence of LWA (and thus two separate MEC hosts, one co-located with an LTE eNB and the other co-located with a WLAN AP (e.g., an RSU)), the translation functions of procedure 800 may be implemented as follows (with the following examples of procedures 800 and 900 discussing the use of IP messages and packets, but similar techniques being used for other types of communication messages).

For message transcoding from LTE to DSRC, an LTE UE may transmit an LTE IP packet to an eNB, which may then be provided to MEC host 1. The LTE IP packet may include or be part of a message intended by the WLAN-only (DRSC) UE. The MEC Host 1 deployed in the LTE network may capture IP packets (messages coming from LTE-only UEs) through its own data plane. The MEC host 1 may translate the LTE IP packet to a DSRC IP packet containing the same message as originally sent by the LTE UE. The MEC host 1 may then send the translated packet (DSRC IP packet) to the MEC host 2 deployed in the WLAN network through an Mp3 interface, which may then queue the translated packet for transmission. When the DSRC IP packet reaches the front of the queue, the DSRC IP packet may be provided to the WLAN access point (AP), and the WLAN AP may then transmit the DSRC IP packet to the WLAN-only UE. The MEC Host 2 may perform multiple unicast transmissions of the obtained DSCR/ITS G5 IP packets to the connected WLAN APs, in order to reach the WLAN-only UEs. (In still other examples, the conversion functionality may be offloaded to the MEC Host 2 or other distributed computing elements).

For message transcoding from DSRC to LTE, the DSRC UE may transmit a DSRC IP packet to the WLAN AP, which may then be provided to MEC host 2. The MEC Host 2 deployed in the WLAN network may capture IP packets (messages coming from WLAN-only UEs) through its own data plane. The DSRC IP packet may include or be part of a message intended by the LTE-only UE. The MEC host 2 may send the DSRC IP packet to the MEC host 1 deployed in the LTE network via the Mp3 interface. The MEC host 1 may translate the DSRC IP packet to an LTE IP packet containing the same message as originally sent by the DSRC UE. The MEC host 1 may then queue the translated packet (LTE IP packet) for transmission. When the LTE IP packet reaches the front of the queue, the LTE IP packet may be transmitted to the LTE UE. The MEC Host 1 may send the resulting LTE IP packets, in broadcast mode, to the connected LTE eNB(s) in order to reach the LTE C-V2X-only UEs. (In still other examples, the conversion functionality may be offloaded to the MEC Host 1 or other distributed computing elements).

In cases where only a single MEC Host is used, such as when the MEC host is collocated with the LTE eNB, procedure 800 may operate in a same manner as discussed previously. Namely, the two MEC apps may concurrently run on the same MEC Host, but each MEC app may autonomously manage its own sets of users. It should be noted that a most computationally powerful MEC host (e.g., the MEC host co-located with a macro/LTE eNB) may be assigned the task of translation, although in other embodiments other MEC hosts may provide translation services. For example, in existence of dense vehicular deployments, the MEC host 2, co-located with an RSU can assist MEC host 1 by performing some of the translations (e.g., computational load balancing).

Figure 9:
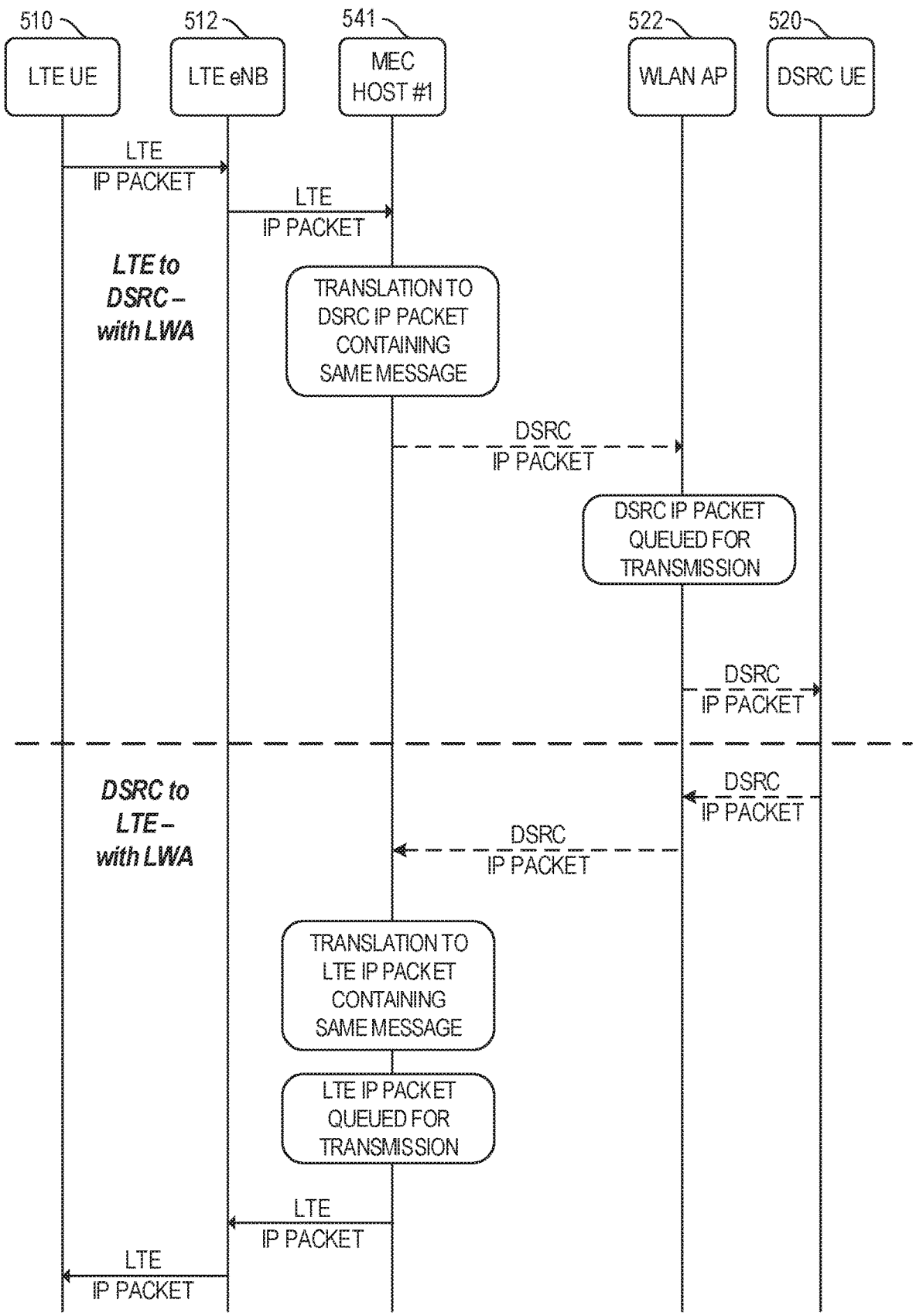

FIG. 9 depicts an example translation procedure 900, which may be used in systems where LWA is used, in accordance with various embodiments. In FIG. 9, a single MEC host may be provided, which is co-located with an LTE eNB. When considering the presence of LWA, the translation functions are implemented by using the same (common) data plane, as follows.

For message transcoding from LTE to DSRC, the MEC Host 1 deployed in the LTE network may capture IP packets (LTE messages) through its own data plane. The MEC host 1 may translate the IP packets into DSRC messages, and may send the resulting DSRC IP packets to one or more WLAN APs deployed in the WLAN network through the Xw interface.

For message transcoding from DSRC to LTE, the WLAN AP deployed in the WLAN network may capture IP packets (DSRC messages) through its own data plane and may forward those to the MEC Host deployed in the LTE network through the Xw interface. Then, MEC Host 1 may translate the received IP packets into LTE messages and the co-located eNB may transmit the LTE messages to the LTE vUEs in a multicast mode.

In both cases (e.g., procedures 800 and 900), the two MEC apps may be capable to communicate and send/receive packets. In this way, the translation functions may be realized by use of communication between the two MEC apps instantiated at the corresponding MEC hosts.

In embodiments, there may be two options for protocol conversion depending on whether some of the vUEs support both technologies (e.g., the ones serving as cluster heads on vehicular Heterogeneous Networks (HetNets)) or not. Such options may be supported in a first MEC service for transforming LTE IP packets to DSRC packets and (and vice versa, a second MEC service transforming DSRC packets to LTE IP packets).

Figure 10A:
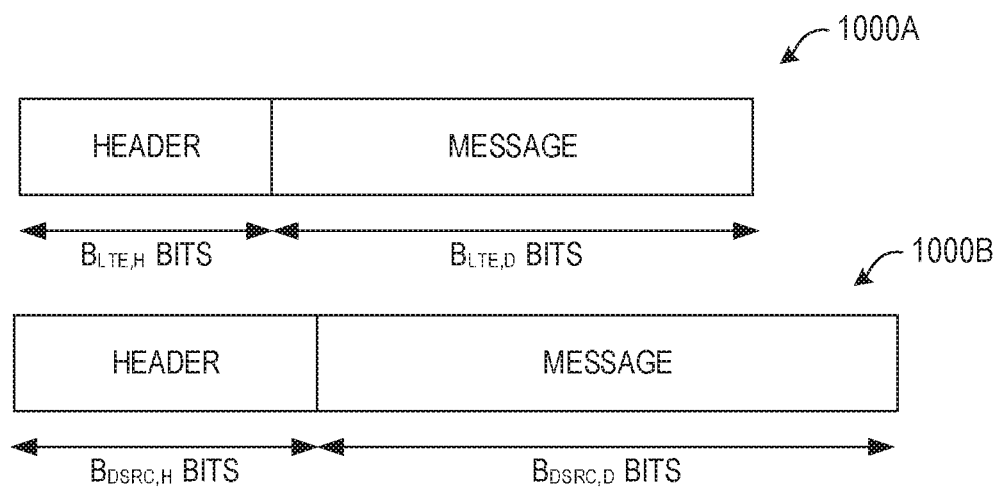
FIGS. 10A and 10B illustrate example versions of IP packets used with message translation procedures, according to an example.

FIG. 10A depicts an example packet structure 1000A for LTE-based protocols, and an example packet structure 1000B for DSRC-based protocols. In embodiments, for conversion for LTE C-V2X-only vehicles and DSRC/ITS G5-only vehicles, considering a LTE C-V2X→DSRC conversion as an example, the LTE IP packet 1000A may comprise $B_{LTE,H}$ bits for the header and $B_{LTE,D}$ bits for the message or payload, and the DSRC packet 1000B may comprise $B_{DSRC,H}$ bits for the header and $B_{DSRC,D}$ bits for the message or payload. Two one-to-one mappings, i.e., $f_{LTE,H\to DSRC,H}$ and $f_{LTE,D\to DSRC,D}$, may be defined as follows:

$$f_{LTE,H\to DSRC,H}: C_{LTE,H} \to C_{DSRC,H}$$

$$f_{LTE,D\to DSRC,D}: C_{LTE,D} \to C_{DSRC,D}$$

where set $C_{LTE,H}$ of size of $2^{B_{LTE,H}}$ elements comprises all possible headers of an LTE IP packet, set $C_{DSRC,H}$ of size of $2^{B_{DSRC,H}}$ elements comprises all possible headers of a DSRC IP packet, set $C_{LTE,D}$ of size of $2^{B_{LTE,D}}$ elements comprises all possible safety messages of an LTE IP packet and set $C_{DSRC,D}$ of size of $2^{B_{DSRC,D}}$ elements comprises all possible safety messages of a DSRC IP packet. Depending on the sizes of headers and messages, mappings $f_{LTE,H\to DSRC,H}$ and $f_{LTE,D\to DSRC,D}$ can either be compression or de-compression functions.

Given that the set of safety messages is finite and the same for all vehicles supporting one or the other protocol (e.g., messages asking from the driver or the autonomous vehicle itself to "accelerate", "slow down", "change route". "park" etc.), the above mentioned mappings can be realized by means of a look-up table (LUT) or other like database (or data store) object stored at the MEC host which undertakes the task of protocol conversion (e.g., MEC host 1 in FIGS. 5A-9). It should be noted that the MEC host assigned the task to perform protocol conversion may allocate (pre-book) an amount of processing and memory resources prior to operation due to the criticality of safety messages together with the possible increased deployment density (e.g., traffic jams).

As an example, the mappings, LUTs, or database object may store various factors associated with the LTE and DSRC protocols, such as data rate, encryption methods, file formats, events, commands, time synchronization information, etc. Using the mappings/LUTs/database objects, the MEC host may identify the message from a payload portion of a received message (e.g., LTE message) and lookup the corresponding message in the new format (e.g., DSRC message). The MEC host may also extract header information, such as IP address of a recipient device, etc. of the received message (e.g., LTE message) and re-encode the header information and the identified message into the new format (e.g., DSRC message).

Figure 10B:
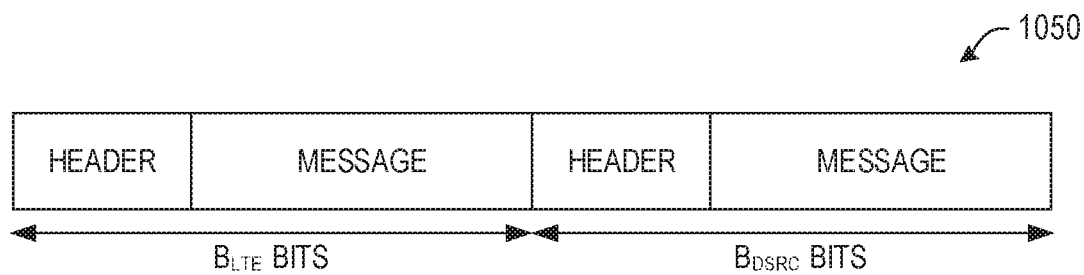

FIG. 10B depicts an example of a concatenated version of a received LTE IP packet and the corresponding, translated DSRC IP packet 1050, in accordance with various embodiments. In embodiments, vUEs may support both protocols and/or multiple eNBs/WLAN APs may reuse MEC infrastructure. In such embodiments, the multiple eNBs/WLAN APs may exploit and share computational resources of a MEC host. For example, where multiple LTE eNBs/WLAN APs are connected to a single MEC host (see e.g., FIG. 9), the single MEC host may construct containers the size of which may be equal to the sum of the sizes of an LTE IP packet and a DSRC IP packet. The content of the container may be a concatenated version of the two packets (i.e., the received LTE IP packet and its DSRC translated equivalent).

In such an implementation, another LTE eNB or a WLAN AP communicating with the single MEC host either in the existence of LWA, or in the absence of LWA, will transmit the whole content of the container. Then, one of the following two options may occur: (1) An LTE C-V2X vUE may be able to decode the first $B_{LTE}$ bits of the extended packet 1050 (transmitted by an LTE eNB connected to MEC host 1), and may discard the remaining contents, or (2) a DSRC vUE may successfully decode the last $B_{DSRC}$ bits of the extended packet 1050 given that the DSRC vUE will not comprehend the first part of the extended packet 1050, e.g., broadcasted by an RSU communicating with MEC host 1.

Although the examples above provide reference to the translation and conversion of IP packets and IP messages, it will be understood that the translation and conversion techniques will equally apply to any data unit or data type that operates at a protocol located at or above the network layer. For instance, applicability of the present translation and conversion techniques also applies to other forms of mobile, cellular, and long range/short range network protocols such as GeoNetworking (GN) and WAVE Short Message Protocol (WSMP) used for V2V and V2I communications.

Figure 11:
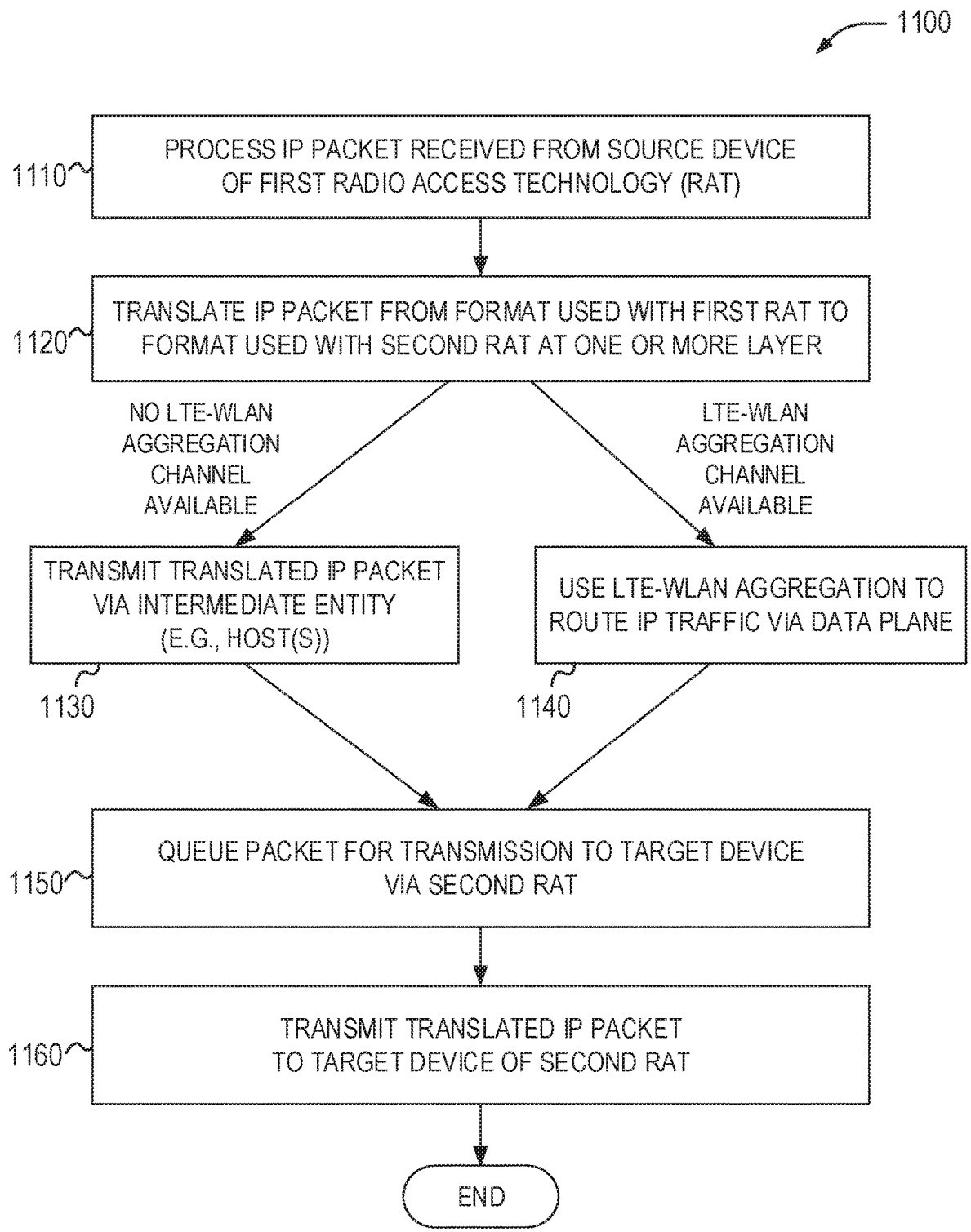
FIG. 11 illustrates a flowchart of a method of communicating and translating messages between radio access network technologies, according to an example.

FIG. 11 illustrates a flowchart 1100 of a method of communicating and translating messages between radio access network technologies. It will be understood that the following operations are depicted from the perspective of a translation service, such as embodied by a MEC host or MEC system as discussed with the examples above; however, corresponding operations may be performed by endpoint communication devices, intermediate devices, or other entities and services in an implementing system.

The method commences at 1110 with the processing of a communication message received from a source (first) device using a first radio access technology, which is addressed to be transmitted to a target (second) device. In an example, this operation includes accessing, obtaining, or receiving the communication message, and processing with a translation function (e.g., a translation function operated by an apparatus such as a MEC entity operated on a computing system). In a further example, the translation function is provided by a MEC (Multi-Access Edge Computing) host, and the communication message is an internet protocol (IP) message, and the first device and the second device operate within a vehicle communications environment. Additionally, in further examples, function is provided by a road side unit (RSU) operating as an infrastructure component of the vehicle communications environment, and wherein the first device and the second device are provided from a respective user equipment (UE) in respective vehicles. For instance, a MEC host may include at least one MEC application that provides vehicle-to-everything (V2X) application functions, as the at least one MEC application provides translation capabilities for the translation function based on information from at least one MEC application programming interface (API), and as the MEC API is operable within a MEC platform operated by the MEC host.

The flowchart 1100 continues at 1120 as the translation function is used to convert the communication message from a format used with the first radio access technology to a format used with a second radio access technology, at one or more communication layer. For instance, the operations to convert the communication message may be performed with transcoding of the communication message in at least one of the: radio, network, transport, application, or facility layers.

Further operations in flowchart 1100 are based on the availability and configuration of an aggregation channel (e.g., LTE-WLAN aggregation channel). In a first example without aggregation, at operation 1130, the translation function is provided by a first Multi-Access Edge Computing (MEC) host, and the operations to transmit the translated communication message also transmit a translated IP message from the first MEC host to a second MEC host (an intermediary), as the second MEC host is used to provide the translated IP message to the second device, as the first MEC host is connected to the first device via first network, and as the second MEC host is connected to the second device via the second network. In a second example with aggregation, at operation 1140, the translation function is provided by a Multi-Access Edge Computing (MEC) host in a MEC system architecture, as the operations to transmit the translated communication message include operations to transmit and route a translated IP message from the MEC host to a network access point using LTE-WLAN aggregation (LWA), and as a data plane of the MEC system architecture is used to route IP traffic from the first network to the second network.

Remaining operations in flowchart 1100 include the queuing (at operation 1150) and transmission (at operation 1160) of the packet for transmission to the target device via the second radio access technology. Accordingly, any of the preceding examples (discussed with reference to FIGS. 1-10) may be incorporated to accomplish these or the other operations of flowchart 1100.

As a consequence of the various embodiments discussed herein, V2X safety messages may be comprehended and exchanged by various vUEs, regardless of the supported RAT protocol, which may enhance the reliability of communication systems. It will be understood that other types of messages and message formats may be frequently exchanged and translated using the techniques discussed herein.

Figure 12:
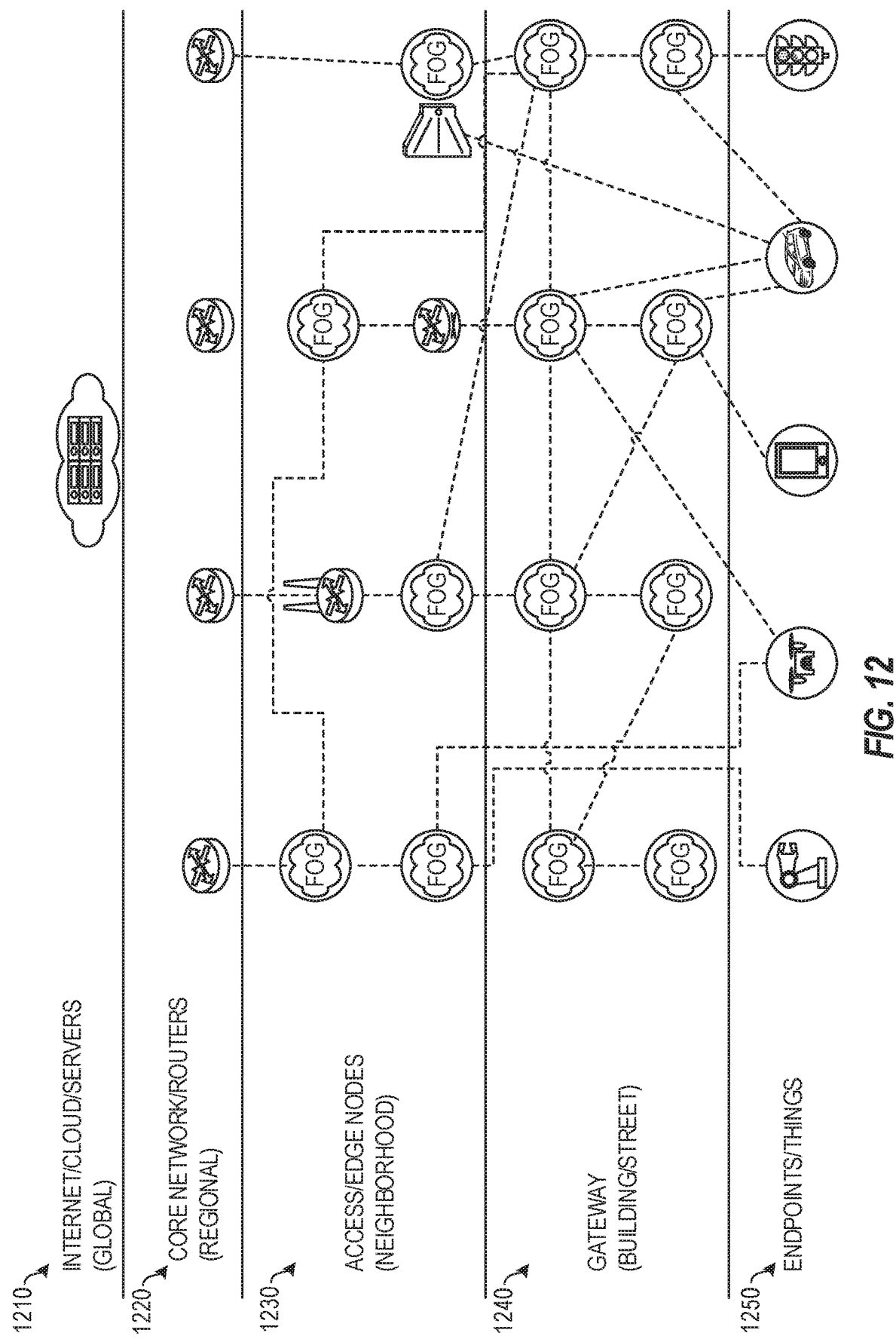
FIG. 12 illustrates a MEC and FOG network topology, according to an example.

FIG. 12 illustrates a MEC and FOG network topology, according to an example. This network topology, which includes a number of conventional networking layers, may be extended through use of the tags and objects discussed herein. Specifically, the relationships between endpoints (at endpoints/things network layer 1250), gateways (at gateway layer 1240), access or edge computing nodes (e.g., at neighborhood nodes layer 1230), core network or routers (e.g., at regional or central office layer 1220), may be represented through the use of linked objects and tag properties.

A FOG network (e.g., established at gateway layer 1240) may represent a dense geographical distribution of near-user edge devices (e.g., FOG nodes), equipped with storage capabilities (e.g., to avoid the need to store data in cloud data centers), communication capabilities (e.g., rather than routed over the internet backbone), control capabilities, configuration capabilities, measurement and management capabilities (rather than controlled primarily by network gateways such as those in the LTE core network), among others. In this context, FIG. 12 illustrates a general architecture that integrates a number of MEC and FOG nodes—categorized in different layers (based on their position, connectivity and processing capabilities, etc.). It will be understood, however, that such FOG nodes may be replaced or augmented by edge computing processing nodes.

FOG nodes may be categorized depending on the topology and the layer where they are located. In contrast, from a MEC standard perspective, each FOG node may be considered as a mobile edge (ME) Host, or a simple entity hosting a ME app and a light-weighted ME Platform. In an example, a MEC or FOG node may be defined as an application instance, connected to or running on a device (ME Host) that is hosting a ME Platform. Here, the application consumes MEC services and is associated to a ME Host in the system. The nodes may be migrated, associated to different ME Hosts, or consume MEC services from other (e.g., local or remote) ME platforms.

In contrast to this approach, traditional V2V applications are reliant on remote cloud data storage and processing to exchange and coordinate information. A cloud data arrangement allows for long-term data collection and storage, but is not optimal for highly time varying data, such as a collision, traffic light change, etc, and may fail in attempting to meet latency challenges, such as stopping a vehicle when a child runs into the street. The data message translation techniques discussed herein enable direct communication to occur among devices (e.g., vehicles) in a low-latency manner, using features in existing MEC services that provide minimal overhead.

Depending on the real-time requirements in a vehicular communications context, a hierarchical structure of data processing and storage nodes are defined. For example, including local ultra-low-latency processing, regional storage and processing as well as remote cloud data-center based storage and processing. SLAs (service level agreements) and KPIs (key performance indicators) may be used to identify where data is best transferred and where it is processed or stored. This typically depends on the Open Systems Interconnection (OSI) layer dependency of the data. For example, lower layer (PHY, MAC, routing, etc.) data typically changes quickly and is better handled locally in order to meet latency requirements. Higher layer data such as Application Layer data is typically less time critical and may be stored and processed in a remote cloud data-center.

Figure 13:
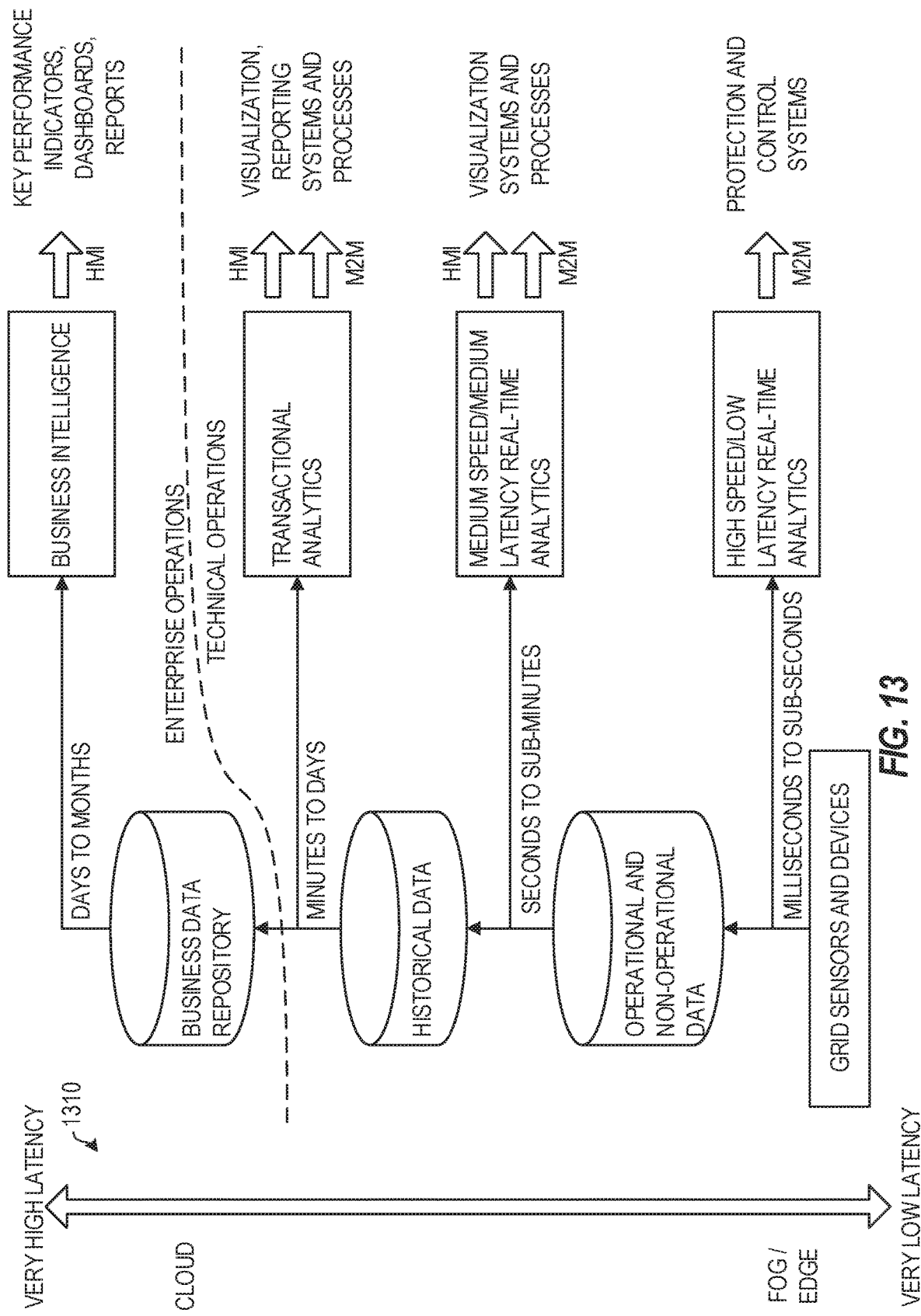
FIG. 13 illustrates processing and storage layers in a MEC and FOG network, according to an example.

FIG. 13 illustrates processing and storage layers in a MEC and FOG network, according to an example. The illustrated data storage or processing hierarchy 1310 relative to the cloud and fog/edge networks allows dynamic reconfiguration of elements to meet latency and data processing parameters.

The lowest hierarchy level is on a vehicle-level. This level stores data on past observations or data obtained from other vehicles. The second hierarchy level is distributed storage across a number of vehicles. This distributed storage may change on short notice depending on vehicle proximity to each other or a target location (e.g., near an accident). The third hierarchy level is in a local anchor point, such as a MEC component, carried by a vehicle in order to coordinate vehicles in a pool of cars. The fourth level of hierarchy is storage shared across MEC components. For example, data is shared between distinct pools of vehicles that are in range of each other.

The fifth level of hierarchy is fixed infrastructure storage, such as in RSUs. This level may aggregate data from entities in hierarchy levels 1-4. The sixth level of hierarchy is storage across fixed infrastructure. This level may, for example, be located in the Core Network of a telecommunications network, or an enterprise cloud. Other types of layers and layer processing may follow from this example.

In an example, the interworking context of the core network (CN) LTE-WLAN Interworking, may be adapted to interworking between LTE and WLAN systems for use with the presently disclosed data message translation techniques. The first mechanism which may be used is a traditional mechanism which interworks through a connection to a P-GW, such as is shown by the scenario FIG. 5A. The second mechanism includes using an LTE-WLAN Aggregation (LWA) mechanism as shown by the scenario of FIG. 5B. Additional detail and context on LWA is provided below.

LWA is a 3GPP feature that allows a mobile device to be configured by the network in order to utilize LTE and Wi-Fi links simultaneously. In particular, LWA operation may include a UE in RRC_CONNECTED to be configured by the eNB to utilize radio resources of LTE and WLAN. Two scenarios are supported depending on the backhaul connection between LTE and WLAN: non-collocated LWA scenario for a non-ideal backhaul and collocated LWA scenario for an ideal/internal backhaul. In the collocated LWA scenario the interface between LTE and WLAN is up to implementation, whereas in the non-collocated LWA scenario the eNB is connected to one or more WLAN Terminations (WTs) via an Xw interface. For LWA, the only required interfaces to the Core Network are an S1-U and S1-MME, which are terminated at the eNB, and no Core Network interface is required for the WLAN/WT.

As mentioned previously, for non-collocated scenarios, the eNB and WTs communicate with one another via an Xw interface, where the WT terminates the Xw interface for WLAN. The Xw interface may include a Xw user plane (Xw UP) protocol that uses services of a transport network layer in order to allow flow control of user data packets transferred over the Xw interface. The user plane of the radio network layer over the Xw interface uses the Xw UP protocol to convey control information related to the user data flow management of E-UTRAN Radio Access Bearer (E-RABs), where each Xw UP protocol instance is associated to one E-RAB only. The flow control function is applied in the downlink when an E-RAB is mapped onto an LWA bearer, i.e. the flow control information is provided by the WT to the eNB for the eNB to control the downlink user data flow to the WT for the LWA bearer. The WT flow control feedback may support indication of successful transmission towards a UE, or successful delivery to the UE.

Additionally, the following functions are provided by the Xw UP protocol: provisioning of Xw UP specific sequence number information for user data transferred from the eNB to the WT for a specific E-RAB configured with the LWA bearer option; information of successful transmission towards or in sequence delivery to the UE of LWA PDUs from WT for user data associated with a specific E-RAB configured with the LWA bearer option; information of LWA PDUs that were not transferred towards or not delivered to the UE; information of the currently desired buffer size at the WT for transmitting to the UE user data associated with a specific E-RAB configured with the LWA bearer option; and information of the currently minimum desired buffer size at the WT for transmitting to the UE user data associated with all E-RABs configured with the LWA bearer option. The Transport Network Layer of the Xw user plane protocol layer may be responsible for the transfer of user data.

Figure 14:
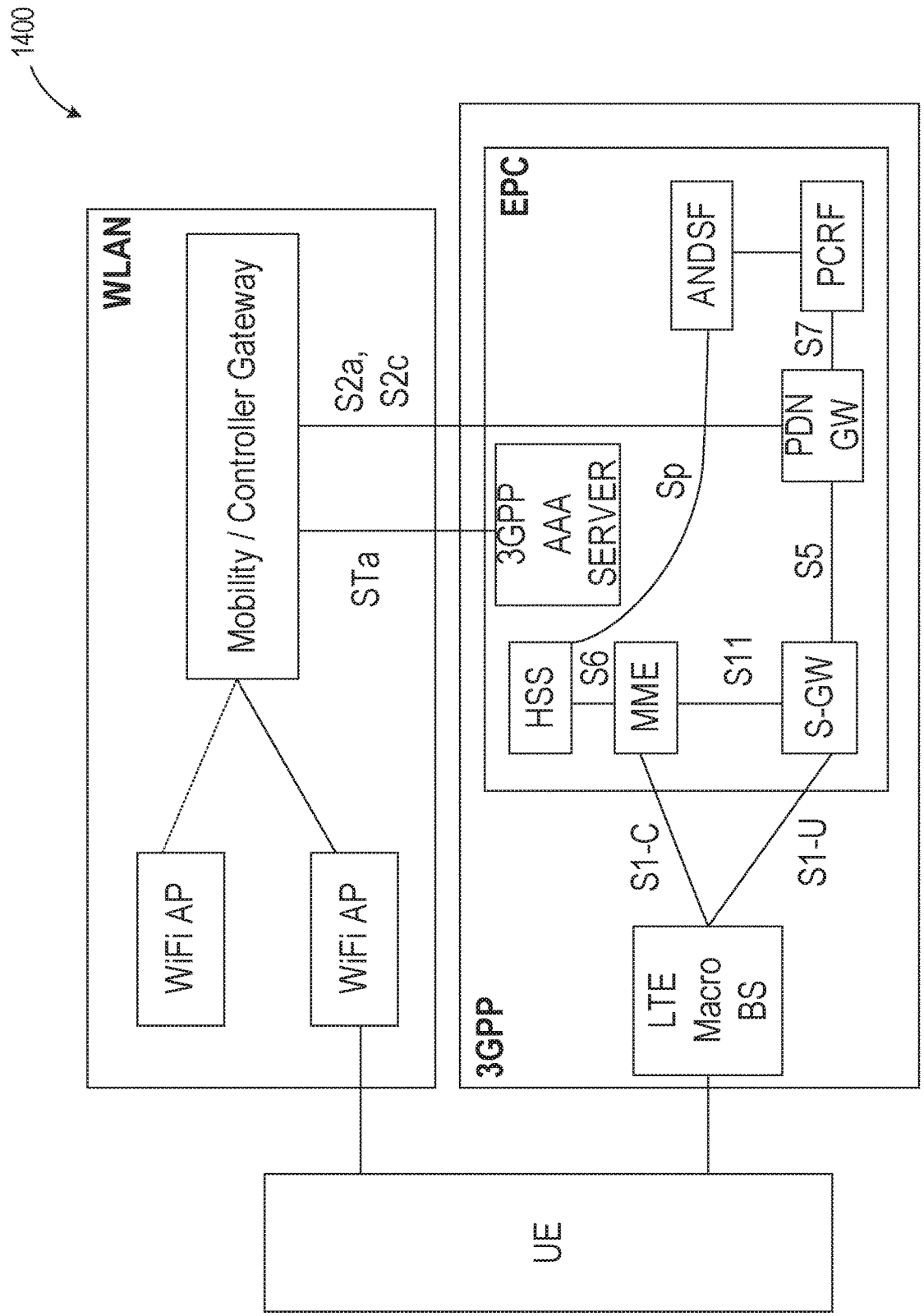
FIG. 14 illustrates an overview of a 3GPP CN-based interworking architecture, according to an example.

FIG. 14 provides an overview of a 3GPP CN-based interworking architecture 1400, which may be extended according to the translation techniques discussed herein. 3GPP may include three implementations for non-LWA 3GPP/WiFi radio interworking, which are all CN-level interworking solutions and enhanced by improving user's QoE and providing more control to operators. As shown in FIG. 14. Wi-Fi APs interwork with 3GPP networks according to S2a, S2c and STa interfaces to access the packet data network gateway (PDN GW) and the 3GPP authentication authorization accounting (AAA) server in the 3GPP evolved packet core (EPC). Two of the three solutions (Solution 1 and Solution 2) may be UE-based solutions applicable to UEs in both the radio resource control (RRC) IDLE and RRC CONNECTED states, while the third solution (Solution 3) is a network-based solution that is only applicable to UEs in the RRC CONNECTED state.

In a first example, an Access Network Discovery and Selection Function (ANDSF) may be used by operators to distribute policies that guide traffic steering decisions to maximize user's Quality of Experience (QoE). In a second example, the offloading rules are specified in RAN specifications, and the RAN provides thresholds used in the rules. In a third example, the traffic steering for UEs is controlled by the 3GPP network using dedicated traffic steering commands based on WLAN measurements.

Figure 15:
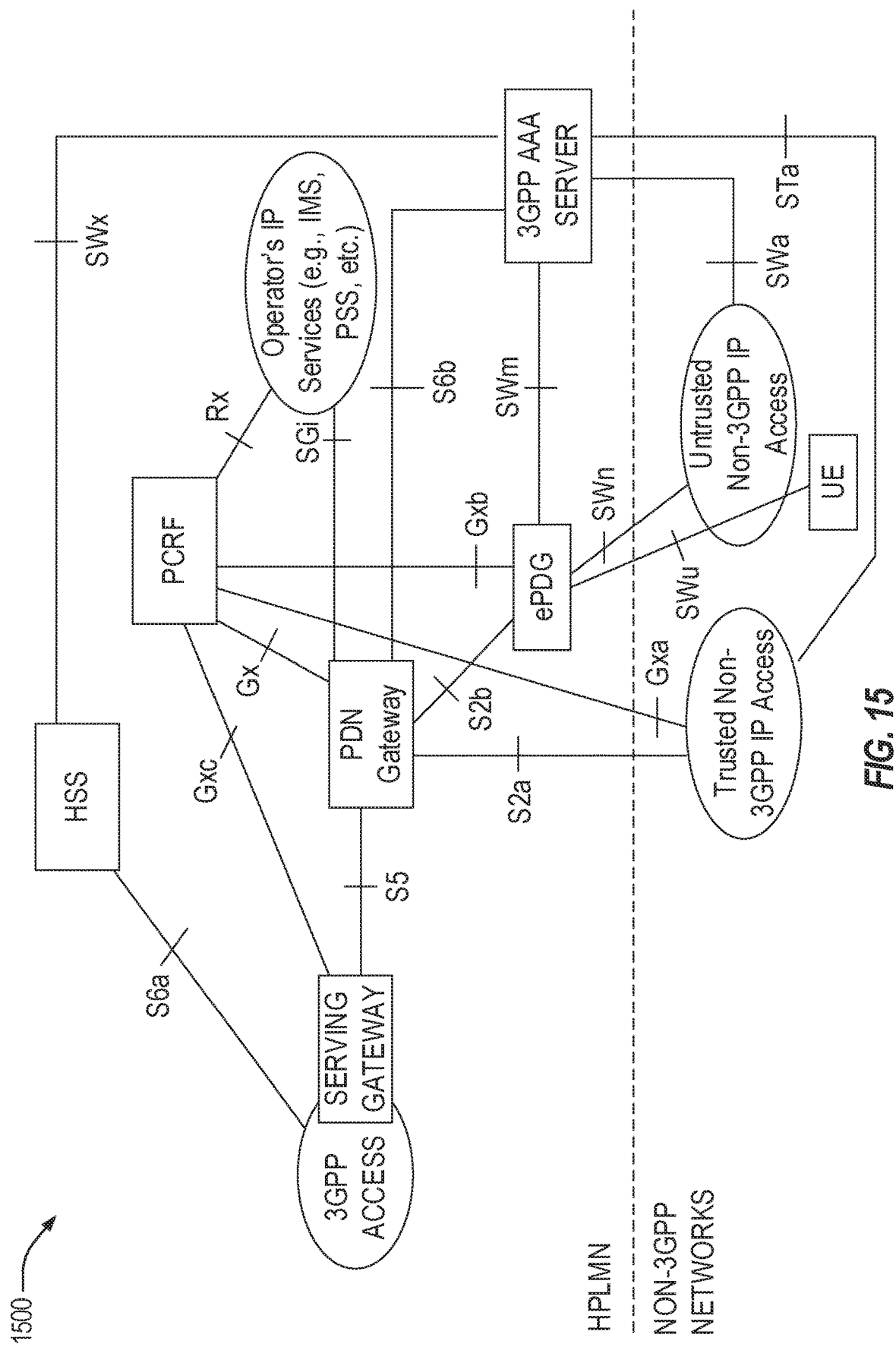
FIG. 15 illustrates a system architecture used to support non-3GPP IP access, according to an example.

FIG. 15 depicts an example of a system architecture 1500 to support non-3GPP IP access, which may be extended according to the translation techniques discussed herein. FIG. 15 specifically depicts a trusted wireless access gateway (TWAG) and Enhanced Packet Data Gateway (ePDG). For Wi-Fi Integration, the most basic forms of integrating licensed and unlicensed band technologies use the 3GPP architecture and interfaces shown by FIG. 15. First, there is the trusted non-3GPP IP access interface, which uses the TWAG to integrate Wi-Fi into the 3GPP core network through the S2a interface to the packet data network gateway (P-GW). This is usually used for offloading 4G data traffic to Wi-Fi. Then there is the untrusted non-3GPP IP access approach, which uses an enhanced packet data gateway (ePDG) to integrate Wi-Fi into the 3GPP core network through the S2b interface to the P-GW. This is usually used to enhance indoor coverage through voice over Wi-Fi (Vo-WiFi). The various reference points shown by FIG. 15 are discussed in 3GPP TS 23.402 v15.1.0 (2017 September).

Connection managers in user devices, sometime using the access network discovery and selection function (ANDSF), typically manage the interworking between the licensed band 4G access and unlicensed band Wi-Fi access. Note that the TWAG and ePDG enable integration and interworking (that is, switching) between licensed and unlicensed bands through loose coupling at the network level. This provides flexibility and eases multivendor operation between licensed and unlicensed band solutions. However, these solutions have the disadvantage of not providing aggregation between licensed and unlicensed bands.

As noted above, the message translation techniques discussed herein may be further applicable to use with 5G, next-generation (NG) networks (including 5G NR, and NR-V2X PC5). The following provides an overview of NG system architectures, and references to the operation of such architectures, which may be further adapted for message translation and MEC services as discussed herein. Thus, the presently described approaches for interoperability between LTE and DSRC can be equally extended for interoperability between 5G and DSRC.

Figure 16A:
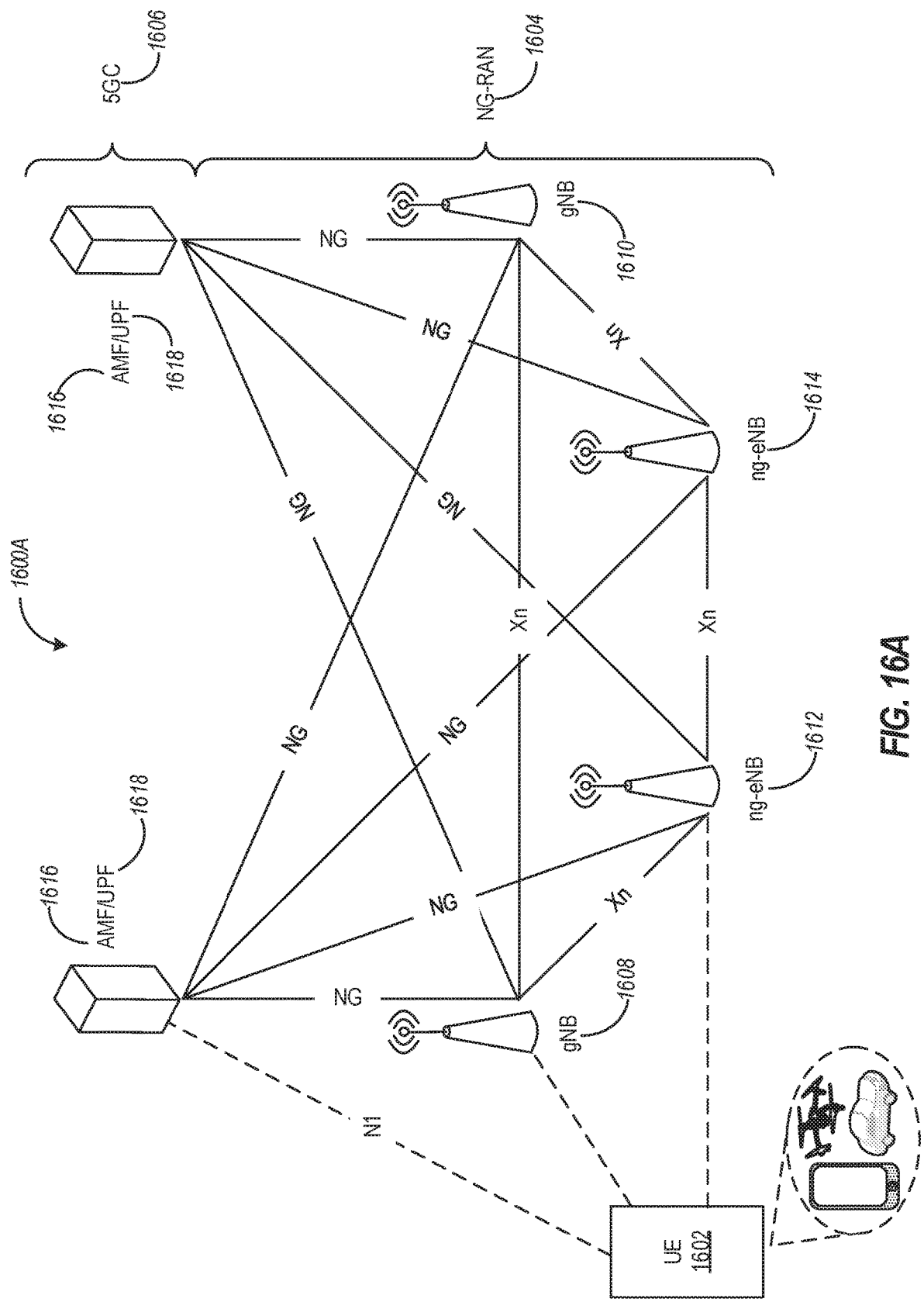
FIG. 16A is a simplified diagram of an example Next-Generation (NG) system architecture, according to an example.

FIG. 16A is a simplified diagram of a Next-Generation (NG) system architecture 1600A, according to an example. Referring to FIG. 16A, the NG system architecture 1600A includes NG-RAN 1604 and a 5G network core (5GC) 1606. The NG-RAN 1604 can include a plurality of NG-RAN nodes, for example, gNBs 1608 and 1610, and NG-eNBs 1612 and 1614. The gNBs 1608/1610 and the NG-eNBs 1612/514 can be communicatively coupled to the UE 1602 via a wireless connection. The core network 1606 (e.g., a 5G core network or 5GC) can include an access and mobility management function (AMF) 1616 or a user plane function (UPF) 1618. The AMF 1616 and the UPF 1618 can be communicatively coupled to the gNBs 1608/510 and the NG-eNBs 1612/1614 via NG interfaces. More specifically, in some aspects, the gNBs 1608/1610 and the NG-eNBs 1612/1614 can be connected to the AMF 1616 by N2 interface, and to the UPF 1618 by N3 interface. The gNBs 1608/1610 and the NG-eNBs 1612/1614 can be coupled to each other via Xn interfaces.

In some aspects, a gNB 1608 can include a node providing New Radio (NR) user plane and control plane protocol termination towards the UE, and can be connected via the NG interface to the 5GC 1606. In some aspects, an NG-eNB 1612/1614 can include a node providing evolved universal terrestrial radio access (E-UTRA) user plane and control plane protocol terminations towards the UE, and is connected via the NG interface to the 5GC 1606. In some aspects, any of the gNBs 1608/1610 and the NG-eNBs 1612/1614 can be implemented as a base station (BS), a mobile edge server, a small cell, a home eNB, although aspects are not so limited. In some aspects, the UE 1602 can be configured for V2X communications within the architecture of FIG. 5A (as well as the architecture of FIG. 5B) and invoke one or more of the message translation techniques disclosed herein.

Figure 16B:
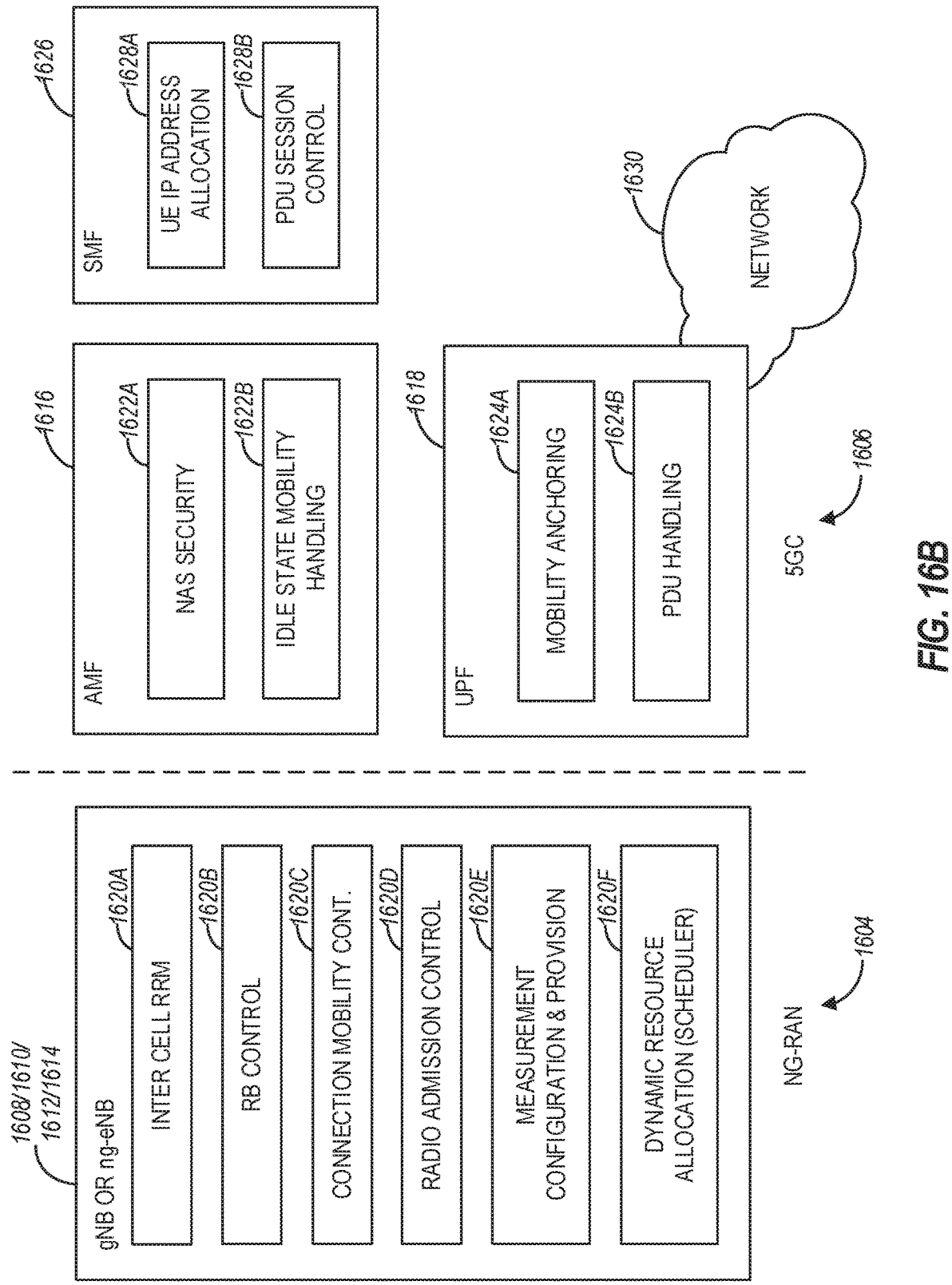
FIG. 16B illustrates an example functional split between next generation radio access network (NG-RAN) and the 5G Core network (5GC), according to an example.

FIG. 16B illustrates a functional split between next generation radio access network (NG-RAN) and the 5G Core network (5GC), according to an example. FIG. 16B illustrates some of the functionalities the gNBs 1608/1610 and the NG-eNBs 1612/1614 can perform within the NG-RAN 1604, as well as the AMF 1616, the UPF 1618, and a Session Management Function (SMF) 1626 (not illustrated in FIG. 16A) within the 5GC 1606. In some aspects, the 5GC 1606 can provide access to a network 1630 (e.g., the Internet) to one or more devices via the NG-RAN 1604.

In some aspects, the gNBs 1608/1610 and the NG-eNBs 1612/1614 can be configured to host the following functions: functions for Radio Resource Management (e.g., inter-cell radio resource management 1620A, radio bearer control 1620B, connection mobility control 1620C, radio admission control 1620D, measurement and measurement reporting configuration for mobility and scheduling 1620E, and dynamic allocation of resources to UEs in both uplink and downlink (scheduling) 1620F); IP header compression: encryption and integrity protection of data; selection of an AMF at UE attachment when no routing to an AMF can be determined from the information provided by the UE; routing of User Plane data towards UPF(s); routing of Control Plane information towards AMF; connection setup and release; scheduling and transmission of paging messages (originated from the AMF); scheduling and transmission of system broadcast information (originated from the AMF or Operation and Maintenance); transport level packet marking in the uplink; session management; support of network slicing; QoS flow management and mapping to data radio bearers; support of UEs in RRC_INACTIVE state; distribution function for non-access stratum (NAS) messages; radio access network sharing; dual connectivity; and tight interworking between NR and E-UTRA, to name a few.

In some aspects, the AMF 1616 can be configured to host the following functions, for example: NAS signaling termination: NAS signaling security 1622A; access stratum (AS) security control; inter core network (CN) node signaling for mobility between 3GPP access networks; idle state/mode mobility handling 1622B, including mobile device, such as a UE reachability (e.g., control and execution of paging retransmission): registration area management; support of intra-system and inter-system mobility; access authentication; access authorization including check of roaming rights: mobility management control (subscription and policies); support of network slicing; or SMF selection, among other functions.

The UPF 1618 can be configured to host the following functions, for example: mobility anchoring 1624A (e.g., anchor point for Intra-/Inter-RAT mobility): packet data unit (PDU) handling 1624B (e.g., external PDU session point of interconnect to data network); packet routing and forwarding; packet inspection and user plane part of policy rule enforcement; traffic usage reporting; uplink classifier to support routing traffic flows to a data network; branching point to support multi-homed PDU session; QoS handling for user plane, e.g., packet filtering, gating, UL/DL rate enforcement; uplink traffic verification (SDF to QoS flow mapping); or downlink packet buffering and downlink data notification triggering, among other functions.

The Session Management function (SMF) 1626 can be configured to host the following functions, for example: session management; UE IP address allocation and management 1628A; selection and control of user plane function (UPF); PDU session control 1628B, including configuring traffic steering at UPF 1618 to route traffic to proper destination; control part of policy enforcement and QoS; or downlink data notification, among other functions.

Figure 16C:
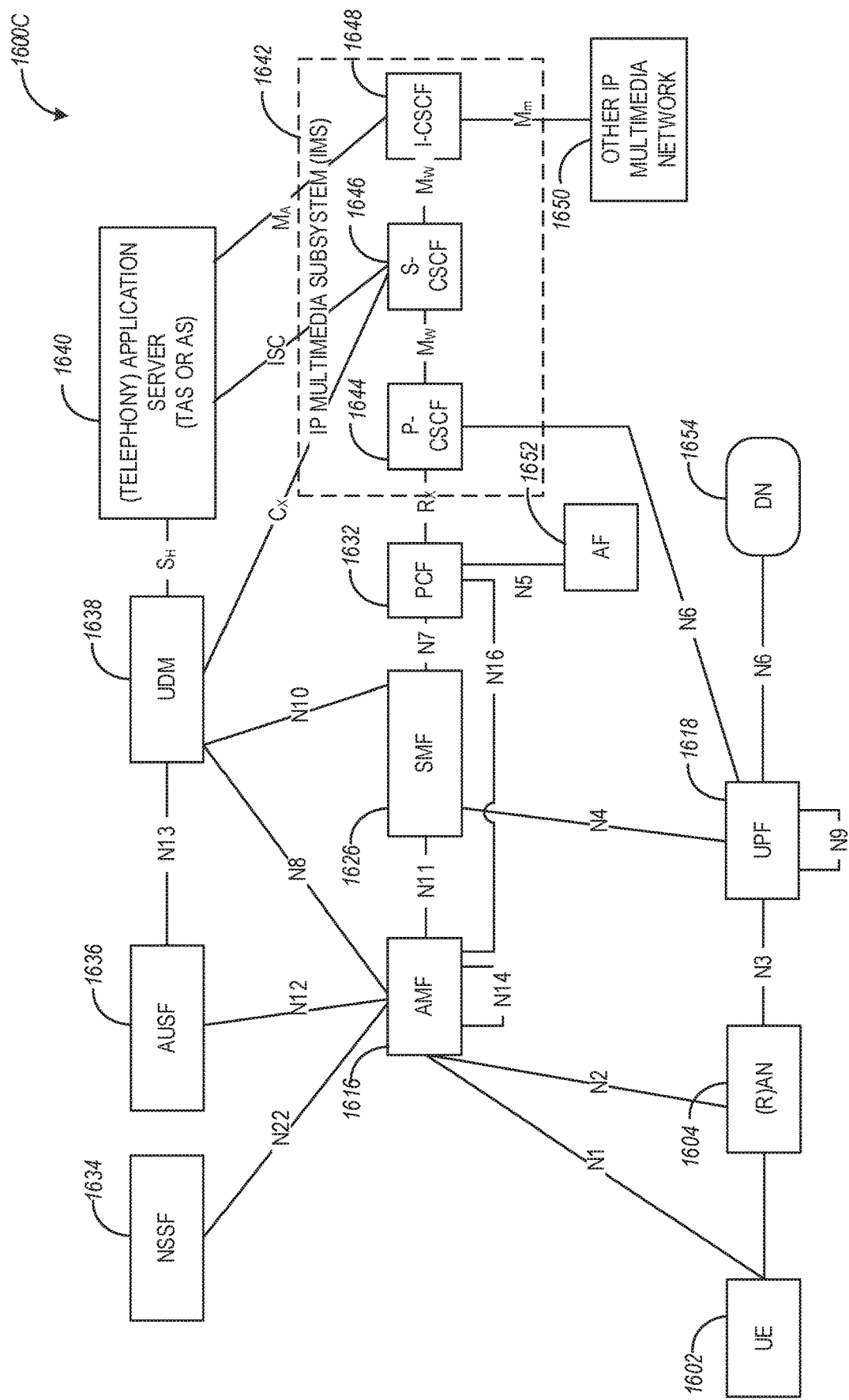
FIGS. 16C and 16D illustrate an example non-roaming 5G system architecture, according to an example.
Figure 16D:
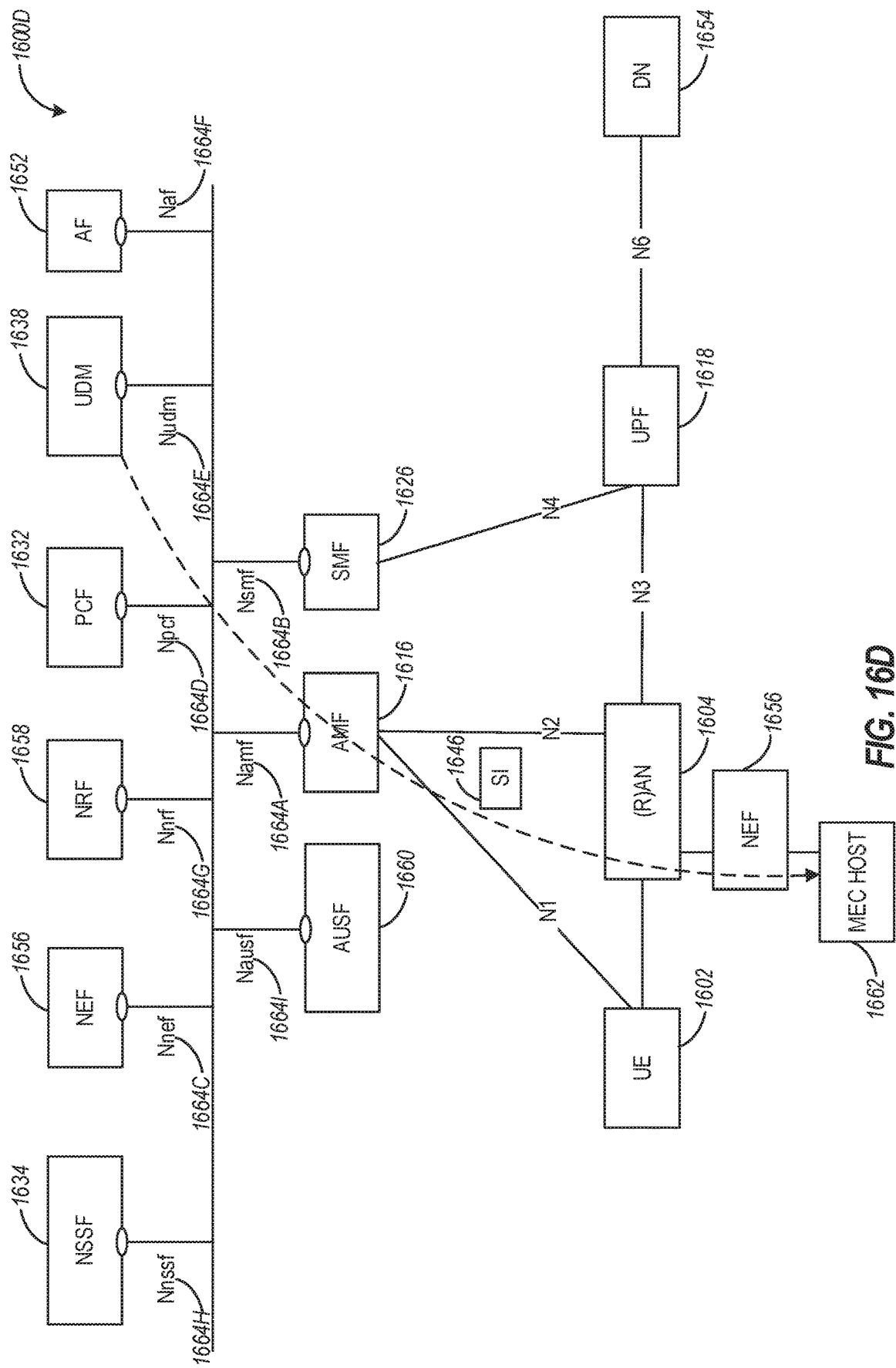

FIG. 16C and FIG. 16D illustrate non-roaming 5G system architectures in accordance with some aspects. Referring to FIG. 16C, a 5G system architecture 1600C in a reference point representation is illustrated. More specifically, UE 1602 can be in communication with RAN 1604 as well as one or more other 5G core (5GC) network entities. The 5G system architecture 1600C includes a plurality of network functions (NFs), such as access and mobility management function (AMF) 1616, session management function (SMF) 1626, policy control function (PCF) 1632, application function (AF) 1652, user plane function (UPF) 1618, network slice selection function (NSSF) 1634, authentication server function (AUSF) 1636, and unified data management (UDM) 1638.

The UPF 1618 can provide a connection to a data network (DN) 1654, which can include, for example, operator services, Internet access, or third-party services. The AMF 1616 can be used to manage access control and mobility and can also include network slice selection functionality. The SMF 1626 can be configured to set up and manage various sessions according to a network policy. The UPF 1618 can be deployed in one or more configurations according to a desired service type. The PCF 1632 can be configured to provide a policy framework using network slicing, mobility management, and roaming (similar to PCRF in a 4G communication system). The UDM 1638 can be configured to store subscriber profiles and data (similar to an HSS in a 4G communication system), such as V2X subscription information or other type of subscription information for services available within the architecture 1600C.

In some aspects, the 5G system architecture 1600C includes an IP multimedia subsystem (IMS) 1642 as well as a plurality of IP multimedia core network subsystem entities, such as call session control functions (CSCFs). More specifically, the IMS 1642 includes a CSCF, which can act as a proxy CSCF (P-CSCF) 1644, a serving CSCF (S-CSCF) 1646, an emergency CSCF (E-CSCF) (not illustrated in FIG. 16C), or interrogating CSCF (I-CSCF) 1648. The P-CSCF 1644 can be configured to be the first contact point for the UE 1602 within the IMS 1642. The S-CSCF 1646 can be configured to handle the session states in the network, and the E-CSCF can be configured to handle certain aspects of emergency sessions such as routing an emergency request to the correct emergency center or public safety answering point (PSAP). The I-CSCF 1648 can be configured to function as the contact point within an operator's network for all IMS connections destined to a subscriber of that network operator, or a roaming subscriber currently located within that network operator's service area. In some aspects, the I-CSCF 1648 can be connected to another IP multimedia network 1650, e.g. an IMS operated by a different network operator.

In some aspects, the UDM 1638 can be coupled to an application server 1640, which can include a telephony application server (TAS) or another application server (AS) including a MEC host. The AS 1640 can be coupled to the IMS 1642 via the S-CSCF 1646 or the I-CSCF 1648. In some aspects, the 5G system architecture 1600C can implement message translation services at the MEC host using one or more of the techniques described herein.

FIG. 16D illustrates a 5G system architecture 1600D in a service-based representation. System architecture 1600D can be substantially similar to (or the same as) system architecture 1600C. In addition to the network entities illustrated in FIG. 16C, system architecture 1600D can also include a network exposure function (NEF) 1656 and a network repository function (NRF) 1658. In some aspects, 5G system architectures can be service-based and interaction between network functions can be represented by corresponding point-to-point reference points Ni (as illustrated in FIG. 16C) or as service-based interfaces (as illustrated in FIG. 16D).

A reference point representation shows that an interaction can exist between corresponding NF services. For example, FIG. 16C illustrates the following reference points: N1 (between the UE 1602 and the AMF 1616), N2 (between the RAN 1604 and the AMF 1616). N3 (between the RAN 1604 and the UPF 1618), N4 (between the SMF 1626 and the UPF 1618), N5 (between the PCF 1632 and the AF 1652), N6 (between the UPF 1618 and the DN 1654), N7 (between the SMF 1626 and the PCF 1632), N8 (between the UDM 1638 and the AMF 1616), N9 (between two UPFs 1618). N10 (between the UDM 1638 and the SMF 1626), N11 (between the AMF 1616 and the SMF 1626), N12 (between the AUSF 1636 and the AMF 1616), N13 (between the AUSF 1636 and the UDM 1638), N14 (between two AMFs 1616), N15 (between the PCF 1632 and the AMF 1616 in case of a non-roaming scenario, or between the PCF 1632 and a visited network and AMF 1616 in case of a roaming scenario), N16 (between two SMFs; not shown), and N22 (between AMF 1616 and NSSF 1634). Other reference point representations not shown in FIG. 16C can also be used.

In some aspects, as illustrated in FIG. 16D, service-based representations can be used to represent network functions within the control plane that enable other authorized network functions to access their services. In this regard, 5G system architecture 1600D can include the following service-based interfaces: Namf 1664A (a service-based interface exhibited by the AMF 1616). Nsmf 1664B (a service-based interface exhibited by the SMF 1626), Nnef 1664C (a service-based interface exhibited by the NEF 1656), Npcf 1664D (a service-based interface exhibited by the PCF 1632). Nudm 1664E (a service-based interface exhibited by the UDM 1638), Naf 1664F (a service-based interface exhibited by the AF 1652), Nnrf 1664G (a service-based interface exhibited by the NRF 1658), Nnssf 1664H (a service-based interface exhibited by the NSSF 1634). Nausf 1664I (a service-based interface exhibited by the AUSF 1660). Other service-based interfaces (e.g., Nudr, N5g-eir, and Nudsf) not shown in FIG. 16D can also be used.

In some aspects, the NEF 1656 can provide an interface to an MEC host such as MEC host 1662. In this regard, subscription information associated with the UE 1602, such as subscription information 1646, can be communicated from UDM 1638 via the AMF 1616, RAN 1604, and NEF 1656 to the MEC host 562 for purposes of translating and communicating messages between different RAT types as disclosed herein.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV- DO). Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT). Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D). Public Automated Land Mobile (Autotel/PALM), ARP (Finnish for Autoradiopuhelin, "car radio phone"), NMT (Nordic Mobile Telephony). High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD). Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11 ad, IEEE 802.1 lay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz), the European ITS-G5 system (i.e., the European flavor of IEEE 802.11p based DSRC, including ITS-G5A (i.e., Operation of ITS-G5 in European ITS frequency bands dedicated to ITS for safety re-lated applications in the frequency range 5.875 GHz to 5,905 GHz), ITS-G5B (i.e., Operation in European ITS frequency bands dedicated to ITS non-safety applications in the frequency range 5.855 GHz to 5,875 GHz), ITS-G5C (i.e., Operation of ITS applications in the frequency range 5,470 GHz to 5,725 GHz)). DSRC in Japan in the 700 MHz band (including 715 MHz to 725 MHz) etc.

Aspects described herein can be used in the context of any spectrum management scheme including dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively), IMT-advanced spectrum, IMT-2020 spectrum (expected to include 3600-3800 MHz, 3.5 GHz bands. 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (e.g., having near-global designation for Multi-Gigabit Wireless Systems (MGWS)/WiGig; in US (FCC part 15) allocated as total 14 GHz spectrum, while EU (ETSI EN 302 567 and ETSI EN 301 217-2 for fixed P2P) allocated as total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g. by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.]. Some of the features in this document are defined for the network side, such as Access Points, eNodeBs, New Radio (NR) or next generation Node Bs (gNodeB or gNB), such as used in the context of 3GPP fifth generation (5G) communication systems, etc. Still, a User Equipment (UE) may take this role as well and act as an Access Points, eNodeBs, gNodeBs, etc. Accordingly, some or all features defined for network equipment may be implemented by a UE or a mobile computing device.

Figure 17:
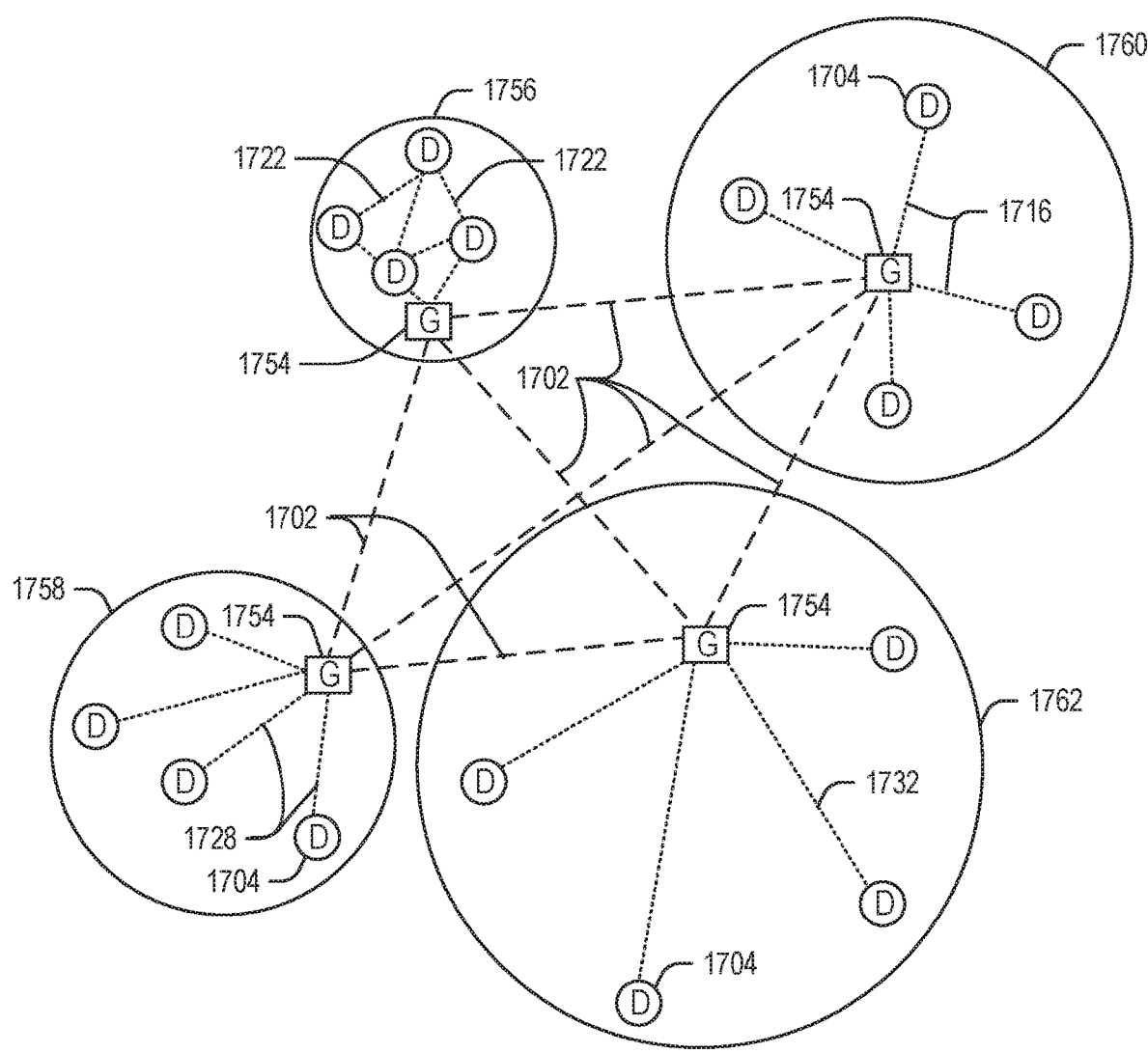
FIG. 17 illustrates a domain topology for respective internet-of-things (IoT) networks coupled through links to respective gateways, according to an example.

In further examples, the preceding examples of network communications and operations may be integrated with IoT and like device-based network architectures. FIG. 17 illustrates an example domain topology for respective IoT networks coupled through links to respective gateways. The IoT is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

MEC use cases have been envisioned to integrate into a number of network and application settings, including those to support network arrangements of IoT deployments. IoT devices are physical or virtualized objects that may communicate on a network (typically at the edge or endpoint of a network), and may include sensors, actuators, and other input/output components, such as to collect data or perform actions from a real world environment. For example, IoT devices may include low-powered devices that are embedded or attached to everyday things, such as buildings, vehicles, packages, etc., to provide sensor, data, or processing functionality. Recently, IoT devices have become more popular and thus applications and use cases using these devices have proliferated.

Various standards have been proposed to more effectively interconnect and operate IoT devices and IoT network use cases, including those with MEC and mobile network architectures. Some of the relevant communication and network architecture standards include those distributed by groups such as ETSI, 3rd Generation Partnership Project (3GPP), Institute of Electrical and Electronics Engineers (IEEE), in addition to specialized IoT application interaction architecture and configuration standards distributed by working groups such as the Open Connectivity Foundation (OCF).

Often, IoT devices are limited in memory, size, or functionality, enabling larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks present a number of new challenges in a heterogeneous network of connectivity comprising a combination of wired and wireless technologies.

FIG. 17 specifically provides a simplified drawing of a domain topology that may be used for a number of IoT networks comprising IoT devices 1704, with the IoT networks 1756, 1758, 1760, 1762, coupled through backbone links 1702 to respective gateways 1754. For example, a number of IoT devices 1704 may communicate with a gateway 1754, and with each other through the gateway 1754. To simplify the drawing, not every IoT device 1704, or communications link (e.g., link 1716, 1722, 1728, or 1732) is labeled. The backbone links 1702 may include any number of wired or wireless technologies, including optical networks, and may be part of a local area network (LAN), a wide area network (WAN), or the Internet. Additionally, such communication links facilitate optical signal paths among both IoT devices 1704 and gateways 1754, including the use of MUXing/deMUXing components that facilitate interconnection of the various devices.

The network topology may include any number of types of IoT networks, such as a mesh network provided with the network 1756 using Bluetooth low energy (BLE) links 1722. Other types of IoT networks that may be present include a wireless local area network (WLAN) network 1758 used to communicate with IoT devices 1704 through IEEE 802.11 (Wi-Fi®) links 1728, a cellular network 1760 used to communicate with IoT devices 1704 through an LTE/LTE-A (4G) or 5G cellular network, and a low-power wide area (LPWA) network 1762, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 1704, such as over the backbone links 1702, may be protected by a decentralized system for authentication, authorization, and accounting (AAA). In a decentralized AAA system, distributed payment, credit, audit, authorization, and authentication systems may be implemented across interconnected heterogeneous network infrastructure. This enables systems and networks to move towards autonomous operations. In these types of autonomous operations, machines may even contract for human resources and negotiate partnerships with other machine networks. This may enable the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may enable systematic and autonomous communication and coordination of service delivery against contractual service objectives, orchestration and QoS-based swarming and fusion of resources. Some of the individual examples of network-based resource processing include the following.

The mesh network 1756, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 1758, for instance, may use systems that perform standards conversion to provide multi-standard connectivity, enabling IoT devices 1704 using different protocols to communicate. Further systems may provide seamless interconnectivity across a multi-standard infrastructure comprising visible Internet resources and hidden Internet resources.

Communications in the cellular network 1760, for instance, may be enhanced by systems that offload data, extend communications to more remote devices, or both. The LPWA network 1762 may include systems that perform non-Internet protocol (IP) to IP interconnections, addressing, and routing. Further, each of the IoT devices 1704 may include the appropriate transceiver for wide area communications with that device. Further, each IoT device 1704 may include other transceivers for communications using additional protocols and frequencies. This is discussed further with respect to the communication environment and hardware of an IoT processing device depicted in FIGS. 19 and 20.

Finally, clusters of IoT devices may be equipped to communicate with other IoT devices as well as with a cloud network. This may enable the IoT devices to form an ad-hoc network between the devices, enabling them to function as a single device, which may be termed a fog device, fog platform, or fog network. This configuration is discussed further with respect to FIG. 18 below.

Figure 18:
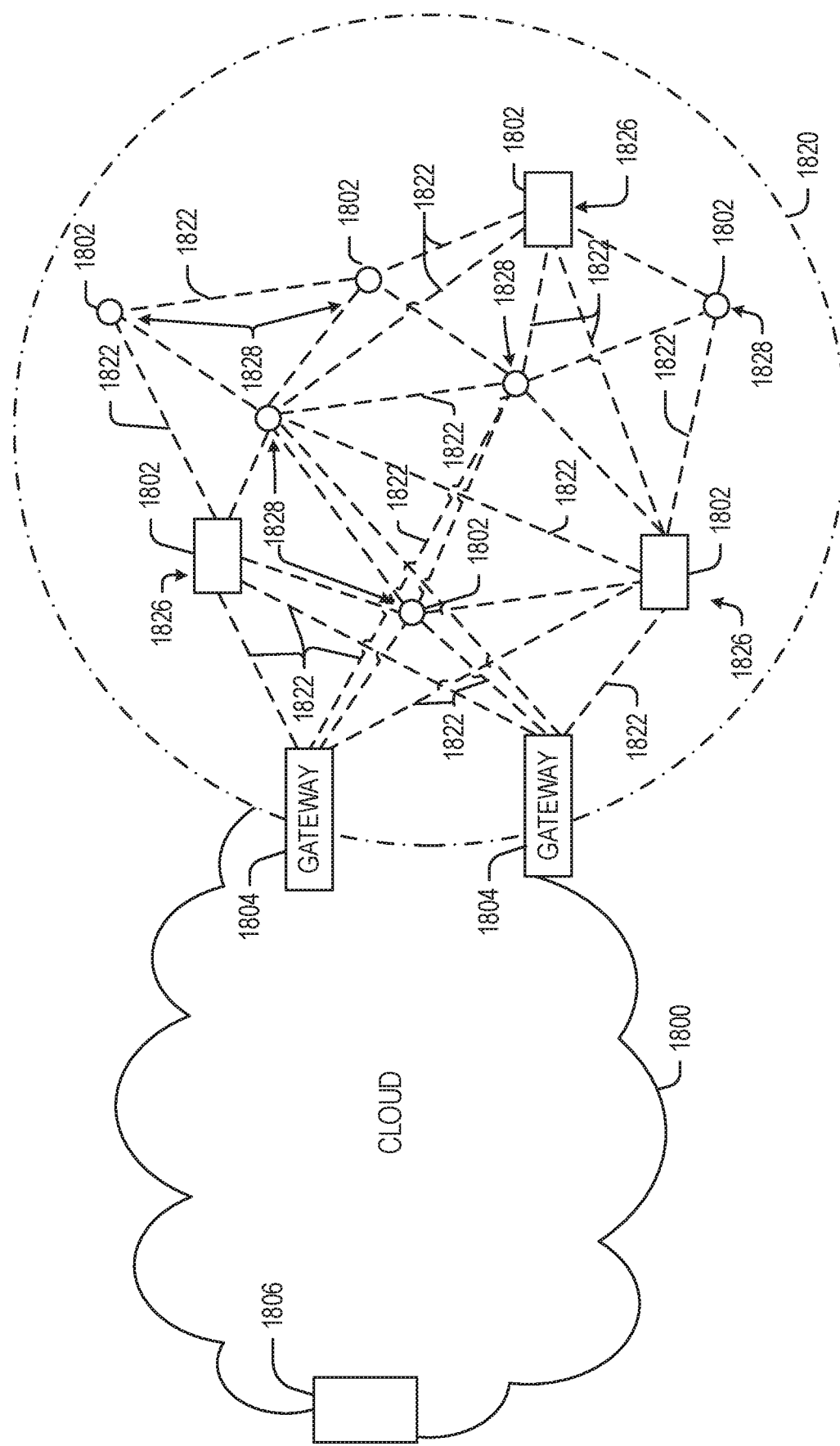
FIG. 18 illustrates a cloud-computing network in communication with a mesh network of IoT/endpoint devices operating as a fog device at the edge of the cloud-computing network, according to an example.

FIG. 18 illustrates a cloud computing network in communication with a mesh network of IoT devices (devices 1802) operating as a fog platform in a networked scenario. The mesh network of IoT devices may be termed a fog network 1820, established from a network of devices operating at the edge of the cloud 1800. To simplify the diagram, not every IoT device 1802 is labeled.

The fog network 1820 may be considered to be a massively interconnected network wherein a number of IoT devices 1802 are in communications with each other, for example, by radio links 1822. The fog network 1820 may establish a horizontal, physical, or virtual resource platform that can be considered to reside between IoT edge devices and cloud or data centers. A fog network, in some examples, may support vertically-isolated, latency-sensitive applications through layered, federated, or distributed computing, storage, and network connectivity operations. However, a fog network may also be used to distribute resources and services at and among the edge and the cloud. Thus, references in the present document to the "edge", "fog", and "cloud" are not necessarily discrete or exclusive of one another.

As an example, the fog network 1820 may be facilitated using an interconnect specification released by the Open Connectivity Foundation™ (OCF). This standard enables devices to discover each other and establish communications for interconnects. Other interconnection protocols may also be used, including, for example, the optimized link state routing (OLSR) Protocol, the better approach to mobile ad-hoc networking (B.A.T.M.A.N.) muting protocol, or the OMA Lightweight M2M (LWM2M) protocol, among others.

Three types of IoT devices 1802 are shown in this example, gateways 1804, data aggregators 1826, and sensors 1828, although any combinations of IoT devices 1802 and functionality may be used. The gateways 1804 may be edge devices that provide communications between the cloud 1800 and the fog 1820, and may also provide the backend process function for data obtained from sensors 1828, such as motion data, flow data, temperature data, and the like. The data aggregators 1826 may collect data from any number of the sensors 1828, and perform the back end processing function for the analysis. The results, raw data, or both may be passed along to the cloud 1800 through the gateways 1804. The sensors 1828 may be full IoT devices 1802, for example, capable of both collecting data and processing the data. In some cases, the sensors 1828 may be more limited in functionality, for example, collecting the data and enabling the data aggregators 1826 or gateways 1804 to process the data.

Communications from any IoT device 1802 may be passed along a convenient path (e.g., a most convenient path) between any of the IoT devices 1802 to reach the gateways 1804. In these networks, the number of interconnections provide substantial redundancy, enabling communications to be maintained, even with the loss of a number of IoT devices 1802. Further, the use of a mesh network may enable IoT devices 1802 that are very low power or located at a distance from infrastructure to be used, as the range to connect to another IoT device 1802 may be much less than the range to connect to the gateways 1804.

The fog 1820 provided from these IoT devices 1802 may be presented to devices in the cloud 1800, such as a server 1806, as a single device located at the edge of the cloud 1800, e.g., a fog device. In this example, the alerts coming from the fog device may be sent without being identified as coming from a specific IoT device 1802 within the fog 1820. In this fashion, the fog 1820 may be considered a distributed platform that provides computing and storage resources to perform processing or data-intensive tasks such as data analytics, data aggregation, and machine-learning, among others.

In some examples, the IoT devices 1802 may be configured using an imperative programming style, e.g., with each IoT device 1802 having a specific function and communication partners. However, the IoT devices 1802 forming the fog device may be configured in a declarative programming style, enabling the IoT devices 1802 to reconfigure their operations and communications, such as to determine needed resources in response to conditions, queries, and device failures. As an example, a query from a user located at a server 1806 about the operations of a subset of equipment monitored by the IoT devices 1802 may result in the fog 1820 device selecting the IoT devices 1802, such as particular sensors 1828, needed to answer the query. The data from these sensors 1828 may then be aggregated and analyzed by any combination of the sensors 1828, data aggregators 1826, or gateways 1804, before being sent on by the fog 1820 device to the server 1806 to answer the query. In this example, IoT devices 1802 in the fog 1820 may select the sensors 1828 used based on the query, such as adding data from flow sensors or temperature sensors. Further, if some of the IoT devices 1802 are not operational, other IoT devices 1802 in the fog 1820 device may provide analogous data, if available.

In other examples, the operations and functionality described above may be embodied by an IoT device machine in the example form of an electronic processing system, within which a set or sequence of instructions may be executed to cause the electronic processing system to perform any one of the methodologies discussed herein, according to an example. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine.

Further, these and like examples to a processor-based system shall be taken to include any set of one or more machines that are controlled by or operated by a processor, set of processors, or processing circuitry (e.g., a machine in the form of a computer, UE. MEC processing device, IoT processing device, etc.) to individually or jointly execute instructions to perform any one or more of the methodologies discussed herein. Accordingly, in various examples, applicable means for processing (e.g., processing, controlling, generating, evaluating, etc.) may be embodied by such processing circuitry.

Figure 19:
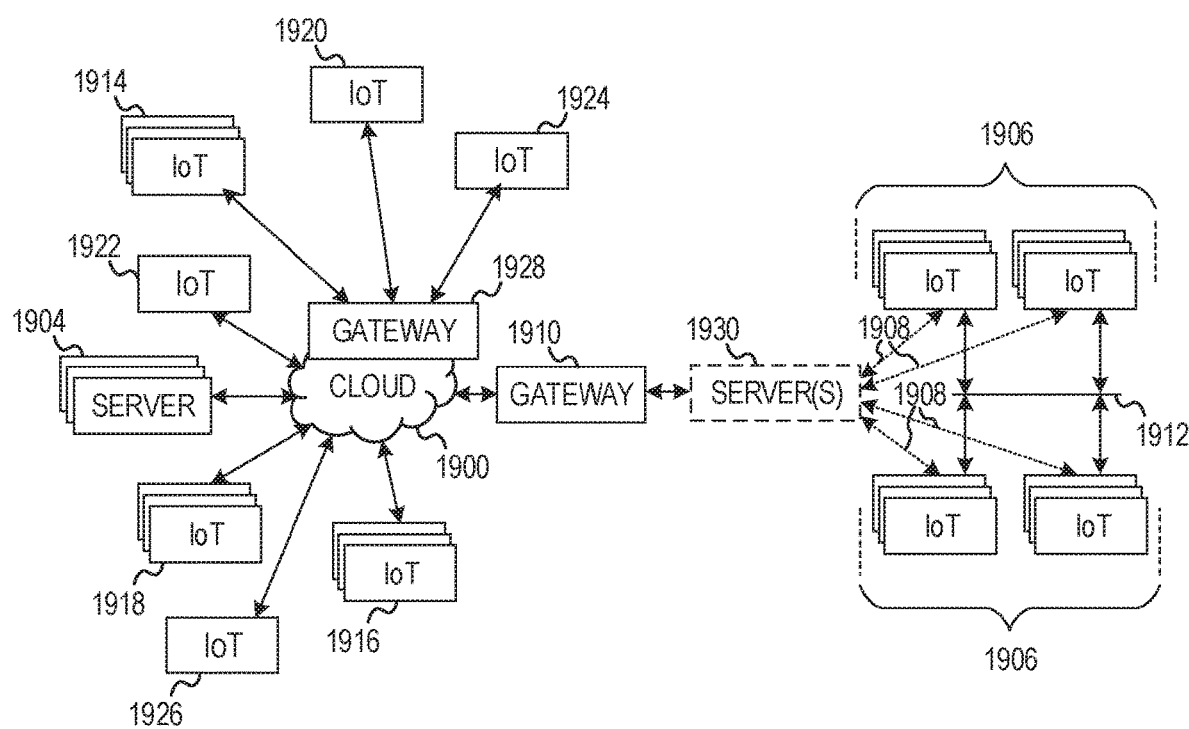
FIG. 19 illustrates a block diagram of a network illustrating communications among a number of IoT/endpoint devices, according to an example.

FIG. 19 illustrates a drawing of a cloud computing network, or cloud 1900, in communication with a number of IoT devices. The cloud 1900 may represent the Internet, or may be a local area network (LAN), or a wide area network (WAN), such as a proprietary network for a company. The IoT devices may include any number of different types of devices, grouped in various combinations. For example, a traffic control group 1906 may include IoT devices along streets in a city. These IoT devices may include stoplights, traffic flow monitors, cameras, weather sensors, and the like. The traffic control group 1906, or other subgroups, may be in communication with the cloud 1900 through wired or wireless links 1908, such as LPWA links, optical links, and the like. Further, a wired or wireless sub-network 1912 may allow the IoT devices to communicate with each other, such as through a local area network, a wireless local area network, and the like. The IoT devices may use another device, such as a gateway 1910 or 1928 to communicate with remote locations such as the cloud 1900; the IoT devices may also use one or more servers 1930 to facilitate communication with the cloud 1900 or with the gateway 1910. For example, the one or more servers 1930 may operate as an intermediate network node to support a local edge cloud or fog implementation among a local area network. Further, the gateway 1928 that is depicted may operate in a cloud-to-gateway-to-many edge devices configuration, such as with the various IoT devices 1914, 1920, 1924 being constrained or dynamic to an assignment and use of resources in the cloud 1900.

Other example groups of IoT devices may include remote weather stations 1914, local information terminals 1916, alarm systems 1918, automated teller machines 1920, alarm panels 1922, or moving vehicles, such as emergency vehicles 1924 or other vehicles 1926, among many others. Each of these IoT devices may be in communication with other IoT devices, with servers 1904, with another IoT fog platform or system, or a combination therein. The groups of IoT devices may be deployed in various residential, commercial, and industrial settings (including in both private or public environments).

As may be seen from FIG. 19, a large number of IoT devices may be communicating through the cloud 1900. This may allow different IoT devices to request or provide information to other devices autonomously. For example, a group of IoT devices (e.g., the traffic control group 1906) may request a current weather forecast from a group of remote weather stations 1914, which may provide the forecast without human intervention. Further, an emergency vehicle 1924 may be alerted by an automated teller machine 1920 that a burglary is in progress. As the emergency vehicle 1924 proceeds towards the automated teller machine 1920, it may access the traffic control group 1906 to request clearance to the location, for example, by lights turning red to block cross traffic at an intersection in sufficient time for the emergency vehicle 1924 to have unimpeded access to the intersection.

Clusters of IoT devices, such as the remote weather stations 1914 or the traffic control group 1906, may be equipped to communicate with other IoT devices as well as with the cloud 1900. This may allow the IoT devices to form an ad-hoc network between the devices, allowing them to function as a single device, which may be termed a fog platform or system (e.g., as described above with reference to FIG. 18).

Figure 20:
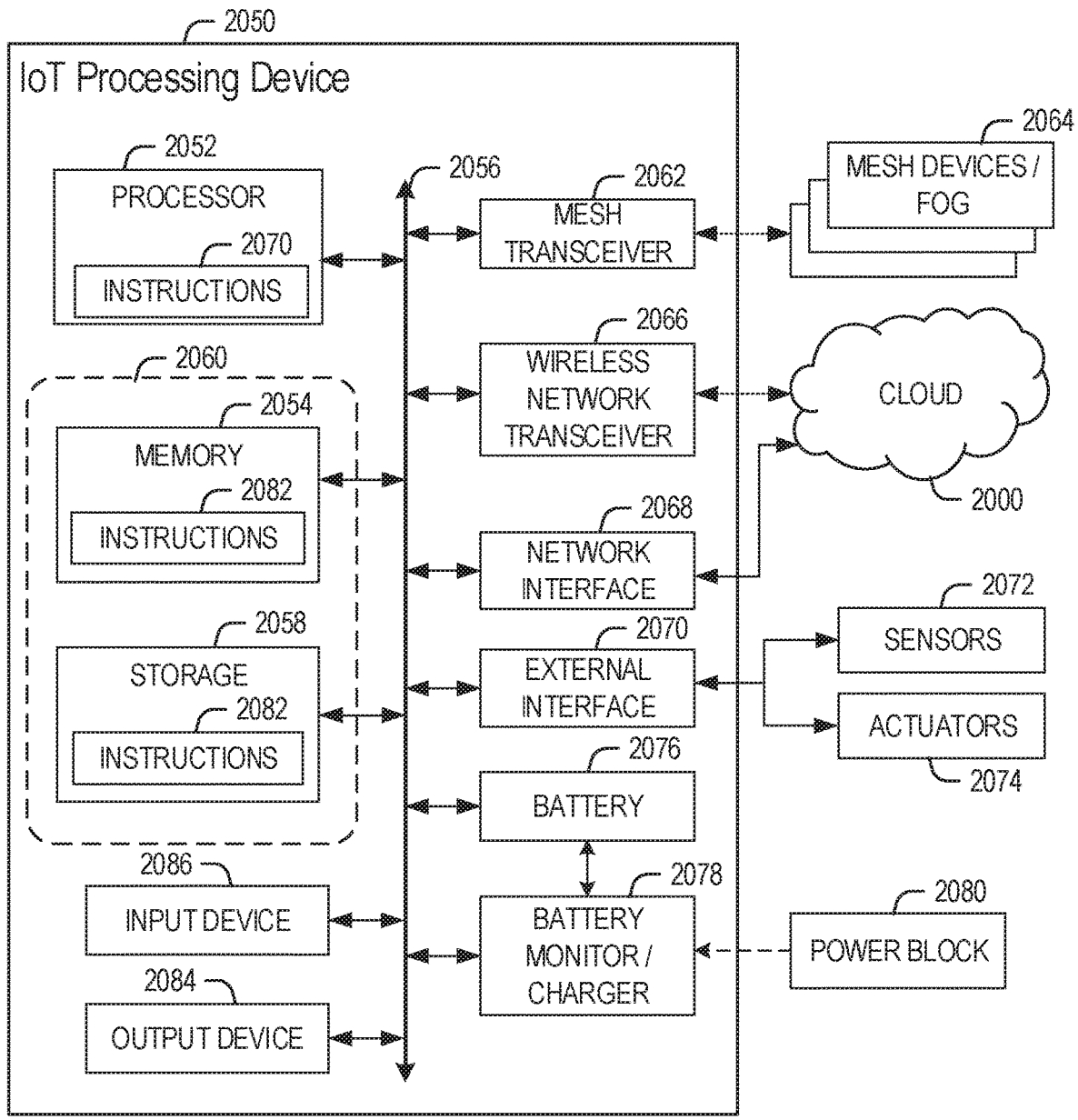
FIG. 20 illustrates a block diagram for an example IoT/endpoint device architecture upon which any one or more of the techniques (e.g., operations, processes, methods, and methodologies) discussed herein may be performed, according to an example.

FIG. 20 is a block diagram of an example of components that may be present in an IoT device 2050 for implementing the techniques described herein. The IoT device 2050 may include any combinations of the components shown in the example or referenced in the disclosure above. The components may be implemented as ICs, portions thereof, discrete electronic devices, or other modules, logic, hardware, software, firmware, or a combination thereof adapted in the IoT device 2050, or as components otherwise incorporated within a chassis of a larger system. Additionally, the block diagram of FIG. 20 is intended to depict a high-level view of components of the IoT device 2050. However, some of the components shown may be omitted, additional components may be present, and different arrangement of the components shown may occur in other implementations.

The IoT device 2050 may include processing circuitry in the form of a processor 2052, which may be a microprocessor, a multi-core processor, a multithreaded processor, an ultra-low voltage processor, an embedded processor, or other known processing elements. The processor 2052 may be a part of a system on a chip (SoC) in which the processor 2052 and other components are formed into a single integrated circuit, or a single package, such as the Edison™ or Galileo™ SoC boards from Intel. As an example, the processor 2052 may include an Intel® Architecture Core™ based processor, such as a Quark™, an Atom™, an i3, an i5, an i7, or an MCU-class processor, or another such processor available from Intel® Corporation. Santa Clara. Calif. However, any number other processors may be used, such as available from Advanced Micro Devices, Inc. (AMD) of Sunnyvale, Calif., a MIPS-based design from MIPS Technologies. Inc. of Sunnyvale. Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 2052 may communicate with a system memory 2054 over an interconnect 2056 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 2058 may also couple to the processor 2052 via the interconnect 2056. In an example the storage 2058 may be implemented via a solid state disk drive (SSDD). Other devices that may be used for the storage 2058 include flash memory cards, such as SD cards, microSD cards, xD picture cards, and the like, and USB flash drives. In low power implementations, the storage 2058 may be on-die memory or registers associated with the processor 2052. However, in some examples, the storage 2058 may be implemented using a micro hard disk drive (HDD). Further, any number of new technologies may be used for the storage 2058 in addition to, or instead of, the technologies described, such resistance change memories, phase change memories, holographic memories, or chemical memories, among others.

The components may communicate over the interconnect 2056. The interconnect 2056 may include any number of technologies, including industry standard architecture (ISA), extended ISA (EISA), peripheral component interconnect (PCI), peripheral component interconnect extended (PCIx). PCI express (PCIe), or any number of other technologies. The interconnect 2056 may be a proprietary bus, for example, used in a SoC based system. Other bus systems may be included, such as an I2C interface, an SPI interface, point to point interfaces, and a power bus, among others.

The interconnect 2056 may couple the processor 2052 to a mesh transceiver 2062, for communications with other mesh devices 2064. The mesh transceiver 2062 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 2064. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 2062 may communicate using multiple standards or radios for communications at different range. For example, the IoT device 2050 may communicate with close devices, e.g., within about 10 meters, using a local transceiver based on BLE, or another low power radio, to save power. More distant mesh devices 2064, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 2066 may be included to communicate with devices or services in the cloud 2000 via local or wide area network protocols. The wireless network transceiver 2066 may be a LPWA transceiver that follows the IEEE 802.15.4, or IEEE 802.15.4g standards, among others. The IoT device 2050 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 2062 and wireless network transceiver 2066, as described herein. For example, the radio transceivers 2062 and 2066 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 2062 and 2066 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 2066, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 2068 may be included to provide a wired communication to the cloud 2000 or to other devices, such as the mesh devices 2064. The wired communication may provide an Ethernet connection, or may be based on other types of networks, such as Controller Area Network (CAN), Local Interconnect Network (LIN), DeviceNet, ControlNet, Data Highway+, PRO- FIBUS, or PROFINET, among many others. An additional NIC 2068 may be included to enable connect to a second network, for example, a NIC 2068 providing communications to the cloud over Ethernet, and a second NIC 2068 providing communications to other devices over another type of network.

Given the variety of types of applicable communications from the device to another component or network, applicable communications circuitry used by the device may include or be embodied by any one or more of components 2062, 2066, 2068, or 2070. Accordingly, in various examples, applicable means for communicating (e.g., receiving, transmitting, etc.) may be embodied by such communications circuitry.

The interconnect 2056 may couple the processor 2052 to an external interface 2070 that is used to connect external devices or subsystems. The external devices may include sensors 2072, such as accelerometers, level sensors, flow sensors, optical light sensors, camera sensors, temperature sensors, a global positioning system (GPS) sensors, pressure sensors, barometric pressure sensors, and the like. The external interface 2070 further may be used to connect the IoT device 2050 to actuators 2074, such as power switches, valve actuators, an audible sound generator, a visual warning device, and the like.

In some optional examples, various input/output (I/O) devices may be present within, or connected to, the IoT device 2050. For example, a display or other output device 2084 may be included to show information, such as sensor readings or actuator position. An input device 2086, such as a touch screen or keypad may be included to accept input. An output device 2084 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 2050.

A battery 2076 may power the IoT device 2050, although in examples in which the IoT device 2050 is mounted in a fixed location, it may have a power supply coupled to an electrical grid. The battery 2076 may be a lithium ion battery, or a metal-air battery, such as a zinc-air battery, an aluminum-air battery, a lithium-air battery, and the like.

A battery monitor/charger 2078 may be included in the IoT device 2050 to track the state of charge (SoCh) of the battery 2076. The battery monitor/charger 2078 may be used to monitor other parameters of the battery 2076 to provide failure predictions, such as the state of health (SoH) and the state of function (SoF) of the battery 2076. The battery monitor/charger 2078 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 2078 may communicate the information on the battery 2076 to the processor 2052 over the interconnect 2056. The battery monitor/charger 2078 may also include an analog-to-digital (ADC) convertor that enables the processor 2052 to directly monitor the voltage of the battery 2076 or the current flow from the battery 2076. The battery parameters may be used to determine actions that the IoT device 2050 may perform, such as transmission frequency, mesh network operation, sensing frequency, and the like.

A power block 2080, or other power supply coupled to a grid, may be coupled with the battery monitor/charger 2078 to charge the battery 2076. In some examples, the power block 2080 may be replaced with a wireless power receiver to obtain the power wirelessly, for example, through a loop antenna in the IoT device 2050. A wireless battery charging circuit, such as an LTC4020 chip from Linear Technologies of Milpitas, Calif. among others, may be included in the battery monitor/charger 2078. The specific charging circuits chosen depend on the size of the battery 2076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 2058 may include instructions 2082 in the form of software, firmware, or hardware commands to implement the techniques described herein. Although such instructions 2082 are shown as code blocks included in the memory 2054 and the storage 2058, it may be understood that any of the code blocks may be replaced with hardwired circuits, for example, built into an application specific integrated circuit (ASIC).

In an example, the instructions 2082 provided via the memory 2054, the storage 2058, or the processor 2052 may be embodied as a non-transitory, machine readable medium 2060 including code to direct the processor 2052 to perform electronic operations in the IoT device 2050. The processor 2052 may access the non-transitory, machine readable medium 2060 over the interconnect 2056. For instance, the non-transitory, machine readable medium 2060 may be embodied by devices described for the storage 2058 or may include specific storage units such as optical disks, flash drives, or any number of other hardware devices. The non-transitory, machine-readable medium 2060 may include instructions to direct the processor 2052 to perform a specific sequence or flow of actions, for example, as described with respect to the flowchart(s) and block diagram(s) of operations and functionality depicted above.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is an apparatus, comprising: processing circuitry; and a memory device including instructions embodied thereon, wherein the instructions, which when executed by the processing circuitry, configure the processing circuitry to perform operations to: access, at a translation function operated at the apparatus, a communication message provided from a first device on a first network operating with a first radio access technology, the communication message addressed to a second device on a second network operating with a second radio access technology; convert the communication message, with the translation function, into a format compatible with the second radio access technology, to produce a translated communication message; and initiate a transmission of the translated communication message, from the translation function, to the second device via the second network using the second radio access technology.

In Example 2, the subject matter of Example 1 includes, wherein the translation function is provided by a MEC (Multi-Access Edge Computing) host, wherein the communication message is an internet protocol (IP) message, and wherein the first device and the second device operate within a vehicle communications environment.

In Example 3, the subject matter of Example 2 includes, wherein the apparatus is a road side unit (RSU) operating as an infrastructure component of the vehicle communications environment, and wherein the first device and the second device are provided from a respective user equipment (UE) in respective vehicles.

In Example 4, the subject matter of Example 3 includes, wherein the MEC host includes at least one MEC application which provides vehicle-to-everything (V2X) application functions, wherein the at least one MEC application provides translation capabilities for the translation function based on information from at least one MEC application programming interface (API), the MEC API being operable within a MEC platform operated by the MEC host.

In Example 5, the subject matter of Examples 1-4 includes, wherein the translation function is provided by a first Multi-Access Edge Computing (MEC) host, wherein the operations to transmit the translated communication message include operations to transmit a translated IP message from the first MEC host to a second MEC host, wherein the second MEC host is used to provide the translated IP message to the second device, wherein the first MEC host is connected to the first device via first network, and wherein the second MEC host is connected to the second device via the second network.

In Example 6, the subject matter of Examples 1-5 includes, wherein the translation function is provided by a Multi-Access Edge Computing (MEC) host in a MEC system architecture, wherein the operations to transmit the translated communication message include operations to transmit a translated IP message from the MEC host to a network access point using LTE-WLAN aggregation (LWA), wherein a data plane of the MEC system architecture is used to route IP traffic from the first network to the second network.

In Example 7, the subject matter of Examples 1-6 includes, wherein the operations to convert the communication message are performed with transcoding of the communication message in at least one of the: radio, network, transport, application, or facility layers.

In Example 8, the subject matter of Examples 1-7 includes, wherein the translation function is operated by an entity operating according to a standard from an ETSI Multi-Access Edge Computing (MEC) standards family, wherein the first radio access technology operates according to one of a 3GPP LTE/5G standards family and an IEEE 802.11p or DSRC/ITS-G5 standards family, and wherein the second radio access technology operates according to the other of the 3GPP LTE/5G standards family and the IEEE 802.11p or DSRC/ITS-G5 standards family.

In Example 9, the subject matter of Examples 1-8 includes, wherein the operations to convert include use of a stored translation definition, the translation definition used to transcode the communication message between a LTE cellular vehicle-to-everything (C-V2X) message format and a IEEE 802.11p or DSRC/ITS-G5 message format.

In Example 10, the subject matter of Example 9 includes, wherein the communication message is a safety message related to vehicle operation, and wherein the translation function pre-allocates processing and memory resources for translating the safety message.

In Example 11, the subject matter of Examples 1-10 includes, wherein the apparatus is connected to at least one access point or base station of one or both of the first network or the second network via a wired network connection.

In Example 12, the subject matter of Examples 1-11 includes, wherein the translation function is provided by a MEC application, and wherein the translated communication message is communicated in a container including the translated communication message and the communication message before translation.

Example 13 is a method, performed by a translation function operated in network equipment, comprising: receiving, at the translation function, a communication message provided from a first device operating on a first network using a first radio access technology, the communication message addressed to a second device operating on a second network using a second radio access technology: converting the communication message, with the translation function, into a format compatible with the second radio access technology to produce a translated communication message; transmitting, from the translation function, the translated communication message, wherein the translated communication message is provided to the second device via the second network using the second radio access technology.

In Example 14, the subject matter of Example 13 includes, wherein the translation function is provided by a MEC (Multi-Access Edge Computing) host, and wherein the first device and the second device operate within a vehicle communications environment.

In Example 15, the subject matter of Example 14 includes, wherein the network equipment is included in a road side unit (RSU) operating as an infrastructure component of the vehicle communications environment, and wherein the first device and the second device are provided from a respective user equipment (UE) in respective vehicles.

In Example 16, the subject matter of Example 15 includes, wherein the MEC host includes at least one MEC application which provides vehicle-to-everything (V2X) application functions, wherein the at least one MEC application provides translation capabilities of the translation function based on information from at least one MEC application programming interface (API), the MEC API being operable within a MEC platform operated by the MEC host.

In Example 17, the subject matter of Examples 13-16 includes, wherein the translation function is provided by a first Multi-Access Edge Computing (MEC) host, wherein the operations to transmit the translated communication message include operations to transmit a translated IP message from the first MEC host to a second MEC host, wherein the second MEC host is used to provide the translated IP message to the second device, wherein the first MEC host is connected to the first device via first network, and wherein the second MEC host is connected to the second device via the second network.

In Example 18, the subject matter of Example 17 includes, wherein the translation function is provided by a Multi-Access Edge Computing (MEC) host in a MEC system architecture, wherein the operations to transmit the translated communication message include operations to transmit a translated IP message from the MEC host to a network access point using LTE-WLAN aggregation (LWA), wherein a data plane of the MEC system architecture is used to route IP traffic from the first network to the second network.

In Example 19, the subject matter of Examples 13-18 includes, wherein the operations to convert the communication message are performed with transcoding of the message in at least one of the: radio, network, transport, application, or facility layers.

In Example 20, the subject matter of Examples 13-19 includes, wherein the translation function is provided on a host operating according to a standard from an ETSI Multi-Access Edge Computing (MEC) standards family, wherein the first radio access technology operates according to one of a 3GPP LTE standards family and an IEEE 802.11p DSRC/ITS-G5 standards family, and wherein the second radio access technology operates according to the other of the 3GPP LTE standards family and the IEEE 802.11p or DSRC/ITS-G5 standards family.

In Example 21, the subject matter of Examples 13-20 includes, wherein the operations to convert include use of a stored translation definition, the translation definition used to transcode the communication message between a Long Term Evaluation (LTE) cellular vehicle-to-everything (C-V2X) message format and a IEEE 802.11p or Dedicated short-range communications (DSRC)/European Telecommunications Standards Institute (ETSI) ITS-G5 message format.

In Example 22, the subject matter of Example 21 includes, wherein the communication message is a safety message related to vehicle operation, and wherein the translation function pre-allocates processing and memory resources for translating the safety message.

In Example 23, the subject matter of Examples 13-22 includes, wherein the translation function is provided by a MEC application, and wherein the translated communication message is communicated in a container including the translated communication message and the communication message before translation.

Incorrect Numbering: M24

Example 24 is at least one machine-readable storage medium including instructions, wherein the instructions, when executed by a processing circuitry of a computing device, cause the processing circuitry to perform operations of any of Examples 13 to 24.

Example 25 is a system, comprising: wireless local area network (WLAN) network equipment, including at least one access point, to communicate in a first network using a first radio access technology, according to a IEEE 802.11p or DSRC/ITS-G5 standards family; Long Term Evolution (LTE) network equipment, including at least one base station, to communicate in a second network using a second radio access technology, according to a 3GPP LTE standards family; and a multi access edge computing (MEC) host, operating at network equipment communicatively coupled to the WLAN network equipment and the LTE network equipment, the MEC host operating a translation function configured to: receive, at a translation function operating at the MEC host, a communication message provided from a first device operating on the first radio network with the first radio access technology, the communication message addressed to a second device operating on the second network with the second radio access technology; convert the communication message, with the translation function, into a format compatible with the second radio access technology, to produce a translated communication message; and transmit, from the translation function, the translated communication message, wherein the translated communication message is provided to the second device via the second network using the second radio access technology.

Example 26 may include an apparatus to be implemented in a mobile edge computing (MEC) host, the apparatus comprising: communication means for obtaining a first message in a first format of a first communication protocol from a first vehicle-to-everything (V2X) user equipment (UE) capable of communicating according to the first communication protocol; and translation means for translating the first message into a second message having a second format of a second communication protocol to be provided to a second V2X UE capable of communicating according to the second communication protocol.

Example 27 may include the apparatus of example 26 and/or some other examples herein, wherein the MEC host is a first MEC host, wherein the communication means is operable to send the second message to a second MEC host, wherein the second MEC host is operable to transmit the translated message to the second V2X UE.

Example 28 may include the apparatus of example 27 and/or some other examples herein, wherein the communication means is operable for sending the second message over an Mp3 interface, and for obtaining the first message over a data plane implemented by virtualization means of the first MEC host.

Example 29 may include the apparatus of example 28 and/or some other examples herein, wherein the translation means is operable for translating another second message into another first message in the first format, and the communication means is operable for obtaining the other second message in the second format from the second MEC host over the Mp3 interface, and for providing the other first message for transmission to the first V2X UE.

Example 30 may include the apparatus of example 29 and/or some other examples herein, wherein the first MEC host is co-located with a Long Term Evolution (LTE) base station and the second MEC host is co-located with a Wireless Local Area Network (WLAN) Access Point (AP), wherein the LTE base station is operable to transmit or broadcast the other first message to the first V2X UE, and wherein the LTE base station does not comprise LTE-WLAN aggregation means.

Example 31 may include the apparatus of example 26 and/or some other examples herein, wherein the communication means is operable for sending the translated message to a WLAN AP over an Xw interface, wherein the WLAN AP is operable to transmit the translated message to the second V2X UE, and wherein the communication means is operable for obtaining the first message over a data plane implemented by virtualization means of the MEC host.

Example 32 may include the apparatus of examples 31 and/or some other examples herein, wherein the translation means is operable for translating another second message into another first message in the first format, and the communication means is operable for obtaining the other second message in the second format from the WLAN AP over the Xw interface, and for providing the other first message for transmission to the first V2X UE.

Example 33 may include the apparatus of example 32 and/or some other examples herein, wherein the MEC host is co-located with an LTE base station, wherein the LTE base station is operable to transmit or broadcast the other first message to the first V2X UE, and wherein the LTE base station comprises LTE-WLAN aggregation means.

Example 34 may include the apparatus of examples 26-33 and/or some other examples herein, wherein the translation means is operable for constructing a container having a size that is equal to a sum of a size of the first message and a size of the second message, and for concatenating the first message and the second message, wherein second V2X UE is operable to decode a portion of the container including the second message and discard a portion of the container including the first message.

Example 35 may include the apparatus of examples 26-34 and/or some other examples herein, wherein the first message is an LTE cellular V2X message and the second message is an IEEE 802.11p based Dedicated Short-Range Communication (DSRC)/European Telecommunications Standards Institute (ETSI) Intelligent Transport System (ITS)-G5 message.

Example 36 may include an apparatus to be implemented in a mobile edge computing (MEC) host, the apparatus configured to: obtain a first message in a first format of a first communication protocol from a first vehicle-to-everything (V2X) user equipment (UE) capable of communicating according to the first communication protocol; and translate the first message into a second message having a second format of a second communication protocol to be provided to a second V2X UE capable of communicating according to the second communication protocol.

Example 37 may include the apparatus of example 36 and/or some other examples herein, wherein the MEC host is a first MEC host, and the apparatus is configured to send the second message to a second MEC host, wherein the second MEC host is configured to transmit the translated message to the second V2X UE.

Example 38 may include the apparatus of example 37 and/or some other examples herein, wherein the apparatus is configured to send the second message over an Mp3 interface, and obtain the first message over a data plane implemented by virtualization infrastructure of the first MEC host.

Example 39 may include the apparatus of example 38 and/or some other examples herein, wherein the apparatus is configured to: obtain another second message in the second format from the second MEC host over the Mp3 interface; translate the other second message into another first message in the first format; and provide the other first message for transmission to the first V2X UE.

Example 40 may include the apparatus of example 39 and/or some other examples herein, wherein the first MEC host is co-located with a Long Term Evolution (LTE) base station and the second MEC host is co-located with a Wireless Local Area Network (WLAN) Access Point (AP), wherein the LTE base station is operable to transmit or broadcast the other first message to the first V2X UE, and wherein the LTE base station does not support LTE-WLAN aggregation.

Example 41 may include the apparatus of example 36 and/or some other examples herein, wherein the apparatus is configured to send the translated message to a WLAN AP over an Xw interface, wherein the WLAN AP is operable to transmit the second message to the second V2X UE, and wherein the apparatus is configured to obtain the first message over a data plane implemented by virtualization infrastructure of the MEC host.

Example 42 may include the apparatus of examples 41 and/or some other examples herein, wherein the apparatus is configured to obtain another second message in the second format from the WLAN AP over the Xw interface, translate the other second message into another first message in the first format, and provide the other first message for transmission to the first V2X UE.

Example 43 may include the apparatus of example 42 and/or some other examples herein, wherein the MEC host is co-located with an LTE base station, wherein the LTE base station is operable to transmit or broadcast the other first message to the first V2X UE, and wherein the LTE base station supports LTE-WLAN aggregation.

Example 44 may include the apparatus of examples 36-43 and/or some other examples herein, wherein, to translate messages, the apparatus is configured to construct a container having a size that is equal to a sum of a size of the first message and a size of the second message, and for concatenating the first message and the second message, wherein second V2X UE is operable to decode a portion of the container including the second message and discard a portion of the container including the first message.

Example 45 may include the apparatus of examples 36-44 and/or some other examples herein, wherein the first message is an LTE cellular V2X message and the second message is an IEEE 802.11p based Dedicated Short-Range Communication (DSRC)/European Telecommunications Standards Institute (ETSI) Intelligent Transport System (ITS)-G5 message.

Example 46 may include a method to be performed by a mobile edge computing (MEC) host, the method comprising: obtaining or causing to obtain a first message in a first format of a first communication protocol from a first vehicle-to-everything (V2X) user equipment (UE) capable of communicating according to the first communication protocol; and translating or causing to translate the first message into a second message having a second format of a second communication protocol to be provided to a second V2X UE capable of communicating according to the second communication protocol.

Example 47 may include the method of example 46 and/or some other examples herein, wherein the MEC host is a first MEC host, and the method comprises sending or causing to send the second message to a second MEC host, wherein the second MEC host is configured to transmit the translated message to the second V2X UE.

Example 48 may include the method of example 47 and/or some other examples herein, wherein the method comprises sending or causing to send the second message over an Mp3 interface, and obtaining or causing to obtain the first message over a data plane implemented by virtualization infrastructure of the first MEC host.

Example 49 may include the method of example 48 and/or some other examples herein, wherein the method comprises obtaining or causing to obtain another second message in the second format from the second MEC host over the Mp3 interface; translating or causing to translate the other second message into another first message in the first format; and providing or causing to provide the other first message for transmission to the first V2X UE.

Example 50 may include the method of example 49 and/or some other examples herein, wherein the first MEC host is co-located with a Long Term Evolution (LTE) base station and the second MEC host is co-located with a Wireless Local Area Network (WLAN) Access Point (AP), wherein the LTE base station is operable to transmit or broadcast the other first message to the first V2X UE, and wherein the LTE base station does not support LTE-WLAN aggregation.

Example 51 may include the method of example 46 and/or some other examples herein, wherein the method comprises sending or causing to send the translated message to a WLAN AP over an Xw interface, wherein the WLAN AP is operable to transmit the second message to the second V2X UE; and obtaining or causing to obtain the first message over a data plane implemented by virtualization infrastructure of the MEC host.

Example 52 may include the method of examples 51 and/or some other examples herein, wherein the method comprises obtaining or causing to obtain another second message in the second format from the WLAN AP over the Xw interface, translating or causing to translate the other second message into another first message in the first format, and providing or causing to provide the other first message for transmission to the first V2X UE.

Example 53 may include the method of example 52 and/or some other examples herein, wherein the MEC host is co-located with an LTE base station, wherein the LTE base station is operable to transmit or broadcast the other first message to the first V2X UE, and wherein the LTE base station supports LTE-WLAN aggregation.

Example 54 may include the method of examples 46-53 and/or some other examples herein, wherein translating messages comprises constructing or causing to construct a container having a size that is equal to a sum of a size of the first message and a size of the second message; and concatenating or causing to concatenate the first message and the second message, wherein second V2X UE is operable to decode a portion of the container including the second message and discard a portion of the container including the first message.

Example 55 may include the method of examples 46-54 and/or some other examples herein, wherein the first message is an LTE cellular V2X message and the second message is an IEEE 802.11p based Dedicated Short-Range Communication (DSRC)/I European Telecommunications Standards Institute (ETSI) Intelligent Transport System (ITS)-G5 message.

Example 56 may include a V2X (vehicular-to-everything) communication system comprising short-range direct communication between vehicles, and are currently having two radio access standards, namely 3GPP LTE C-V2X and IEEE 802.11p based DSRC, also called ETSI ITS-G5 in Europe.

Example 57 may include a MEC system which orchestrates and executes the translation of DSRC/ITS-G5 messages into LTE C-V2X messages and vice versa, the MEC system comprising MEC apps acting as V2X application functions and running on MEC Hosts, wherein the MEC apps comprise translation capability functions and exploiting relevant information from MEC APIs (as part of the MEC Platform of each the MEC Host). The MEC system of example 57 may be combined with example 1, example 26, and/or some other examples herein.

Example 58 may include the MEC system of example 57 and/or some other examples herein, wherein the MEC Hosts (and the related message translation capabilities) are co-located with RSUs (Road Side Units) as part of the road infrastructure in the described V2X system.

Example 59 may include the MEC system of example 57 and/or some other examples herein, wherein the MEC Hosts (and the related message translation capabilities) and are deployed in vehicles (e.g. cars, trucks) as enhanced nodes in the described V2X system.

Example 60 may include a MEC system with MEC hosts deployed in 3GPP networks with the support of LTE-WLAN aggregation (LWA), over S1 and Xw interfaces, where the data plane of MEC architecture is instructed by the MEC platform to route the IP traffic from the underlying networks (that can be both 3GPP and/or non-3GPP network).

Example 61 may include a MEC system with MEC hosts deployed in 3GPP networks without the support of LTE-WLAN aggregation (LWA), with MEC hosts associated separately to 3GPP LTE C-V2X and IEEE 802.11p based DSRC messages are deployed respectively over S1 and Xw interfaces, where each data plane of those MEC hosts is instructed by the respective MEC platform to route the IP traffic from the underlying network (respectively 3GPP and non-3GPP network).

Example 62 may include the system of example 56 and/or some other examples herein, wherein the system comprises multiple levels of protocol translation, i.e. radio access layers as well as higher layers, such as network and transport.

Example 63 may include the system of example 63 and/or some other examples herein, adapted or deployed as a MEC system.

Example 67 may include the system of examples 56-63 and/or some other examples herein, the system to support LTE and NR/S5G dual connectivity.

Example 65 may include the MEC system of example 57 and/or some other examples herein, wherein the translation capability functions of the running MEC apps are defined by means of a look-up table, or, any other mapping structure useful for transforming LTE C-V2X message containing entities into DSRC/ITS-G5 ones or vice versa.

Example 66 may include the MEC system of examples 57 and 65 and/or some other examples herein, wherein, for the translation capability functions contained in the running MEC apps the MEC host pre-books storage and memory resources for storing the sets of safety messages, as well as the message translation functions (e.g., the look-up table of example 65).

Example 67 may include the MEC system of example 57 and/or some other examples herein, wherein a given MEC host can be connected to just one, or multiple LTE eNBs in its vicinity by means of an Ethernet connection (or, any other wired communication protocol), as well as to a MEC host collocated with an RSU, by means of an Mp3 interface, when LWA is not supported.

Example 68 may include the MEC system of example 57 and/or some other examples herein, wherein a given MEC host can be connected to just one, or multiple LTE eNBs in its vicinity by means of an Ethernet connection (or, any other wired communication protocol), along with one, or multiple RSUs, by means of an Xw interface, when LWA is supported.

Example 69 may include the MEC system of example 57 and/or some other examples herein, wherein the MEC apps acting as V2X application functions and running on MEC hosts can exploit the possible availability of containers at the MEC hosts, the content of which may be composed of the received message-carrying entity of one supported protocol (LTE C-V2X or DSRC/ITS-G5) and the converted version of the other supported protocol (LTE C-V2X or DSRC/ITS-G5).

Example 70 may include the MEC system of examples 57 and 69 and/or some other examples herein, wherein the MEC host is operable to pre-book storage resources for the creation of the containers.

Example 71 may include an apparatus comprising means to perform one or more elements of a method described in or related to any of examples 1-70, or any other method or process described herein.

Example 72 may include one or more non-transitory computer-readable media comprising instructions to cause an electronic device, upon execution of the instructions by one or more processors of the electronic device, to perform one or more elements of a method described in or related to any of examples 1-70, or any other method or process described herein.

Example 73 may include an apparatus comprising logic, modules, or circuitry to perform one or more elements of a method described in or related to any of examples 1-70, or any other method or process described herein.

Example 74 may include a method, technique, or process as described in or related to any of examples 1-70, or portions or parts thereof.

Example 75 may include an apparatus comprising: one or more processors and one or more computer readable media comprising instructions that, when executed by the one or more processors, cause the one or more processors to perform the method, techniques, or process as described in or related to any of examples 1-70, or portions thereof.

Example 76 may include a signal as described in or related to any of examples 1-70, or portions or parts thereof.

Example 77 may include a signal in a wireless network as described in or related to any of examples 1-70, or as otherwise shown and described herein.

Example 78 may include a method of communicating in a wireless network as described in or related to any of examples 1-70, or as otherwise shown and described herein.

Example 79 may include a system for providing wireless communication as described in or related to any of examples 1-70, or as otherwise shown and described herein.

Example 80 may include a device for providing wireless communication as described in or related to any of examples 1-70, or as otherwise shown and described herein.

Example 81 is a network comprising respective devices and device communication mediums for performing any of the operations of examples 1-70, or as otherwise shown and described herein.

Example 82 is an 4G/5G communications network topology, the network topology comprising respective communication links adapted to perform communications for the operations of any of examples 1-70, or as otherwise shown and described herein.

Example 83 is an edge cloud computing device implementation comprising processing nodes and computing units adapted for performing any of the operations of examples 1-70, or as otherwise shown and described herein.

Example 84 is an ETSI MEC system implementation comprising devices, processing nodes, and computing units adapted for performing any of the operations of examples 1-70, or as otherwise shown and described herein.

Example 85 is a MEC system implementation, having the protocol conversion function being operated at a static or a moving MEC host, for deployment among mobility-based use cases.

Example 86 is an edge cloud network platform comprising physical and logical computing resources adapted for performing any of the operations of examples 1-70, or as otherwise shown and described herein.

Example 87 is an apparatus comprising means for performing any of the operations of examples 1-70, or as otherwise shown and described herein.

Example 88 is a system to perform the operations of any of examples 1-70, or as otherwise shown and described herein.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:
1. An apparatus, comprising:
network communication circuitry, configured to communicate with:
a first network, comprising a wireless local area network (WLAN) having at least one access point to communicate using a first radio access technology according to an IEEE 802.11p or DSRC/ITS-G5 standards family; and a second network, comprising a Long Term Evolution (LTE) network having at least one base station to communicate using a second radio access technology according to a 3GPP LTE standards family;

processing circuitry; and a memory device including instructions embodied thereon, wherein the instructions, which when executed by the processing circuitry, configure the processing circuitry to perform operations of a multi-access edge computing (MEC) host in a MEC system architecture, the MEC host configured by the instructions to:

access, at a translation function operating at the MEC host, a received communication message provided from a first device on the first network operating with the first radio access technology, the communication message addressed to a second device on the second network operating with the second radio access technology;

convert the communication message, with the translation function, into a format compatible with the second radio access technology, to produce a translated communication message; and initiate a transmission of the translated communication message, from the translation function, to the second device via the second network using the second radio access technology.

2. The apparatus of claim 1, wherein the communication message is an internet protocol (IP) message, and wherein the first device and the second device operate within a vehicle communications environment.

3. The apparatus of claim 2, wherein the apparatus is a road side unit (RSU) operating as an infrastructure component of the vehicle communications environment, and wherein the first device and the second device are provided from a respective user equipment (UE) in respective vehicles.

4. The apparatus of claim 3, wherein the MEC host includes at least one MEC application which provides vehicle-to-everything (V2X) application functions, wherein the at least one MEC application provides translation capabilities for the translation function based on information from at least one MEC application programming interface (API), the MEC API being operable within a MEC platform operated by the MEC host.

5. The apparatus of claim 1, wherein the operations to initiate the transmission of the translated communication message include operations to initiate the transmission of a translated internet protocol (IP) message from the MEC host to a second MEC host, wherein the second MEC host is used to provide the translated IP message to the second device, wherein the MEC host is connected to the first device via the first network, and wherein the second MEC host is connected to the second device via the second network.

6. The apparatus of claim 1, wherein the operations to initiate the transmission of the translated communication message include operations to transmit a translated internet protocol (IP) message from the MEC host to a network access point using LTE-WLAN aggregation (LWA), wherein a data plane of the MEC system architecture is used to route IP traffic from the first network to the second network.

7. The apparatus of claim 1, wherein the operations to convert the communication message are performed with transcoding of the communication message in at least one of the: radio, network, transport, application, or facility layers.

8. The apparatus of claim 1, wherein the MEC host operates according to a standard from an European Telecommunications Standards Institute (ETSI) Multi-Access Edge Computing (MEC) standards family, and wherein the translation function is further configured to convert another received communication message from a format compatible with the second radio access technology into a format compatible with the first, radio access technology.

9. The apparatus of claim 1, wherein the operations to convert include use of a stored translation definition, the translation definition used to transcode the communication message between a LIE cellular vehicle-to-everything (C-V2X) message format and an IEEE 802.11p or DSRC/ITS-G5 message format.

10. The apparatus of claim 9, wherein the communication message is a safety message related to vehicle operation, and wherein the translation function pre-allocates processing and memory resources for translating the safety message.

11. The apparatus of claim 1, wherein the apparatus is connected to at least one access point or base station of one or both of the first network or the second network via a wired network connection.

12. The apparatus of claim 1, wherein the translation function is provided by a MEC application, and wherein the translated communication message is communicated in a container including the translated communication message and the communication message before translation.

13. A method, performed by a translation function operating at a multi-access edge computing (MEC) host in a MEC system architecture, the method comprising:

receiving, at the translation function, a communication message provided from a first device operating on a first network using a first radio access technology, the communication message addressed to a second device operating on a second network using a second radio access technology;

converting the communication message, with the translation function, into a format compatible with the second radio access technology to produce a translated communication message; and transmitting, from the translation function, the translated communication message, wherein the translated communication message is provided to the second device via the second network using the second radio access technology;

wherein the first network comprises a wireless local area network (WLAN) having at least one access point to communicate using a first radio access technology according to an IEEE 802.11p or DSRC/ITS-G5 standards family; and wherein the second network comprises a Long Term Evolution (LTE) network having at least one base station to communicate using a second radio access technology according to a 3GPP LTE standards family.

14. The method of claim 13, and wherein the first device and the second device operate within a vehicle communications environment.

15. The method of claim 14, wherein the method is performed using network equipment included in a road side unit (RSU) operating as an infrastructure component of the vehicle communications environment, and wherein the first device and the second device are provided from a respective user equipment (UE) in respective vehicles.

16. The method of claim 15, wherein the MEC host includes at least one MEC application which provides vehicle-to-everything (V2X) application functions, wherein the at least one MEC application provides translation capabilities of the translation function based on information from at least one MEC application programming interface (API), the MEC API being operable within a MEC platform operated by the MEC host.

17. The method of claim 13, wherein transmitting the translated communication message includes transmitting a translated internet protocol (IP) message from the MEC host to a second MEC host, wherein the second MEC host is used to provide the translated IP message to the second device, wherein the MEC host is connected to the first device via the first network, and wherein the second MEC host is connected to the second device via the second network.

18. The method of claim 17, wherein transmitting the translated communication message includes transmitting a translated internet protocol (IP) message from the MEC host to a network access point using LTE-WLAN aggregation (LWA), wherein a data plane of the MEC system architecture is used to route IP traffic from the first network to the second network.

19. The method of claim 13, wherein the operations to convert the communication message are performed with transcoding of the message in at least one of the: radio, network, transport, application, or facility layers.

20. The method of claim 13, wherein the MEC host operates according to a standard from an European Telecommunications Standards Institute (ETSI) Multi-Access Edge Computing (MEC) standards family, and wherein the method comprises converting, using the translation function, another received communication message from a format compatible with the second radio access technology into a format compatible with the first, radio access technology.

21. The method of claim 13, wherein converting the communication message includes use of a stored translation definition, the translation definition used to transcode the communication message between a Long Term Evaluation (LTE) cellular vehicle-to-everything (C-V2X) message format and an IEEE 802.11p or Dedicated short-range communications (DSRC)/European Telecommunications Standards Institute (ETSI) ITS-G5 message format.

22. The method of claim 21, wherein the communication message is a safety message related to vehicle operation, and wherein the translation function pre-allocates processing and memory resources for translating the safety message.

23. The method of claim 13, wherein the translation function is provided by a MEC application, and wherein the translated communication message is communicated in a container including the translated communication message and the communication message before translation.

24. A system, comprising:
wireless local area network (WLAN) network equipment, including at least one access point, to communicate in a first network using a first radio access technology, according to an IEEE 802.11p or DSRC/ITS-G5 standards family;
Long Term Evolution (LTE) network equipment, including at least one base station, to communicate in a second network using a second radio access technology, according to a 3GPP LTE standards family; and
a multi-access edge computing (MEC) host, operating at network equipment communicatively coupled to the WLAN network equipment and the LTE network equipment, the MEC host configured to:
receive, at a translation function operating at the MEC host, a communication message provided from a first device operating on the first network with the first radio access technology, the communication message addressed to a second device operating on the second network with the second radio access technology;
convert the communication message, with the translation function, into a format compatible with the second radio access technology, to produce a translated communication message; and
transmit, from the translation function, the translated communication message, wherein the translated communication message is provided to the second device via the second network using the second radio access technology.

* * * * *

UNITED STATES PATENT AND TRADEMARK OFFICE
CERTIFICATE OF CORRECTION

PATENT NO.         : 11,064,057 B2
APPLICATION NO.    : 16/646957
DATED              : July 13, 2021
INVENTOR(S)        : Sabella et al.

Page 1 of 1

It is certified that error appears in the above-identified patent and that said Letters Patent is hereby corrected as shown below:

In the Claims

In Column 42, Line 8, in Claim 8, delete "first," and insert --first-- therefor

In Column 42, Line 12, in Claim 9, delete "LIE" and insert --LTE-- therefor

In Column 43, Line 31, in Claim 20, delete "first," and insert --first-- therefor Signed and Sealed this
Nineteenth Day of October, 2021

Drew Hirshfeld
*Performing the Functions and Duties of the
Under Secretary of Commerce for Intellectual Property and
Director of the United States Patent and Trademark Office*